US012423764B1

(12) United States Patent
Partin et al.

(10) Patent No.: US 12,423,764 B1
(45) Date of Patent: Sep. 23, 2025

(54) SAFETY COMPLIANCE, IDENTIFICATION, AND SECURITY MONITORING SYSTEM

(71) Applicant: Force Field Construction Intelligence, LLC, Charlotte, NC (US)

(72) Inventors: Russell Cooper Partin, Lake Wylie, SC (US); John Graham Partin, II, Fripp Island, SC (US)

(73) Assignee: Force Field Construction Intelligence, LLC, Charlotte, NC (US)

( * ) Notice: Subject to any disclaimer, the term of this patent is extended or adjusted under 35 U.S.C. 154(b) by 0 days.

(21) Appl. No.: 19/170,674

(22) Filed: Apr. 4, 2025

Related U.S. Application Data

(60) Provisional application No. 63/691,620, filed on Sep. 6, 2024.

(51) Int. Cl.
*G06Q 10/10* (2023.01)
*G05D 1/689* (2024.01)
(Continued)

(52) U.S. Cl.
CPC .......... *G06Q 50/265* (2013.01); *G05D 1/689* (2024.01); *G06K 7/1417* (2013.01); *G06V 10/82* (2022.01); *G06V 20/17* (2022.01); *G06V 40/10* (2022.01); *G05D 2101/15* (2024.01); *G05D 2105/70* (2024.01); *G05D 2105/85* (2024.01);
(Continued)

(58) Field of Classification Search
CPC .. G06Q 50/265; G05D 1/689; G05D 2101/15; G05D 2105/70; G05D 2105/85; G05D 2109/20; G05D 2111/10; G05D 2111/20; G05D 2111/32; G05D 2111/52;
(Continued)

(56) References Cited

U.S. PATENT DOCUMENTS 11,492,113 B1 * 11/2022 Kipurs ................... G05D 1/106
11,645,600 B2    5/2023 Daley et al.
(Continued)

OTHER PUBLICATIONS

Akinsemoyin A, Awolusi I, Chakraborty D, Al-Bayati AJ, Akanmu A. Unmanned Aerial Systems and Deep Learning for Safety and Health Activity Monitoring on Construction Sites. Sensors (Basel). Jul. 26, 2023. (Year: 2023).*

*Primary Examiner* — Jonathan P Ouellette
(74) *Attorney, Agent, or Firm* — NEO IP

(57) ABSTRACT

The present invention relates to a safety compliance, identification, and security monitoring system that includes a monitoring device operable to capture images/videos of a predefined area and persons and events within the area. The monitoring device is further operable to determine whether persons within the area are wearing required personal protective equipment. In one embodiment, the monitoring device initiates an alert a safety equipment infraction. In one embodiment, the system is operable to further record an incident report identifying the nature, date, and location of the infraction, as well as the identity of the person committing the infraction. In one embodiment, the system is operable to monitor various external conditions, such as heat, humidity, smoke, and initiate an alert of the external condition detected. In one embodiment, the system detects quality assurance/quality control issues, including situations involving inspecting equipment, tools, and/or materials for non-conformance.

13 Claims, 5 Drawing Sheets

(51) Int. Cl.
    *G06K 7/14*     (2006.01)
    *G06Q 30/02*     (2023.01)
    *G06Q 30/06*     (2023.01)
    *G06Q 40/08*     (2012.01)
    *G06Q 50/26*     (2012.01)
    *G06V 10/82*     (2022.01)
    *G06V 20/17*     (2022.01)
    *G06V 40/10*     (2022.01)
    G05D 101/15     (2024.01)
    G05D 105/70     (2024.01)
    G05D 105/85     (2024.01)
    G05D 109/20     (2024.01)
    G05D 111/10     (2024.01)
    G05D 111/20     (2024.01)
    G05D 111/30     (2024.01)
    G05D 111/50     (2024.01)
(52) U.S. Cl.
    CPC ...... *G05D 2109/20* (2024.01); *G05D 2111/10* (2024.01); *G05D 2111/20* (2024.01); *G05D 2111/32* (2024.01); *G05D 2111/52* (2024.01); *G05D 2111/56* (2024.01)
(58) Field of Classification Search
    CPC .. G05D 2111/56; G06K 7/1417; G06V 10/82; G06V 20/17; G06V 40/10
    USPC .......................................... 705/1.1–912, 325
    See application file for complete search history.

(56) References Cited

U.S. PATENT DOCUMENTS

| | | |
|---|---|---|
| 11,763,438 B2 | 9/2023 | Waldron et al. |
| 12,159,255 B2 | 12/2024 | Bean et al. |
| 2014/0307076 A1 | 10/2014 | Deutsch |
| 2017/0210486 A1* | 7/2017 | O'Brien ................. H04N 23/71 |
| 2020/0202471 A1 | 6/2020 | Barak et al. |
| 2021/0264799 A1* | 8/2021 | Belt ....................... B64U 80/70 |
| 2022/0119233 A1* | 4/2022 | Brenner ................. E02F 9/262 |
| 2022/0284566 A1 | 9/2022 | Starr et al. |
| 2023/0072434 A1 | 3/2023 | Zhang et al. |
| 2023/0186634 A1 | 6/2023 | Wong et al. |
| 2023/0230379 A1 | 7/2023 | Chaudhry et al. |
| 2023/0324873 A1 | 10/2023 | Bowers |
| 2023/0410526 A1 | 12/2023 | Sonawane et al. |
| 2024/0281954 A1 | 8/2024 | Osman et al. |
| 2024/0288837 A1* | 8/2024 | Kessler .................. H04W 4/90 |
| 2024/0346417 A1 | 10/2024 | Ryle et al. |
| 2025/0131186 A1* | 4/2025 | Perumal ................ G06V 20/52 |

\* cited by examiner

SAFETY COMPLIANCE, IDENTIFICATION, AND SECURITY MONITORING SYSTEM

CROSS REFERENCES TO RELATED APPLICATIONS

This application claims priority to and the benefit of U.S. Provisional Application No. 63/691,620, filed Sep. 6, 2024, which is incorporated herein by reference in its entirety.

BACKGROUND OF THE INVENTION

1. Field of the Invention

The present invention relates to a compliance monitoring system, and more specifically to a safety compliance, identification, and security monitoring system including unmanned aerial vehicle (UAV) technology.

2. Description of the Prior Art

It is generally known in the prior art to provide site safety compliance systems including an imaging device.

Prior art patent documents include the following:

US Patent Pub. No. 2023/0186634 for Vision-based monitoring of site safety compliance based on worker re-identification and personal protective equipment classification by inventors Wong et al., filed Aug. 25, 2022 and published Jun. 15, 2023, is directed to a system for monitoring safety compliance, comprising a plurality of cameras and a computing system. The plurality of cameras are configured to obtain data, and the data comprises multiple images associated with one or more objects. The computing system is configured to process the data to determine the safety compliance of the one or more objects associated with the multiple images based on implementing a first model trained for re-identification. The computing system is further configured to train the first model for re-identification, by determining a similarity loss and updating the first model based on the similarity loss.

U.S. Pat. No. 11,763,438 for Systems, methods, and computer program products for access-related safety determinations by inventor Waldron, filed Apr. 30, 2021 and issued Sep. 19, 2023, is directed to systems, methods, and computer program products for access-related safety determinations. An example method includes receiving first image data of a field of view of a first imaging device that includes an access location and determining an access condition of the access location based upon the first image data. In response to an attempt to access the access location by a first user, the method includes receiving second image data of a field of view of a second imaging device that includes the first user upon which to perform a safety determination. The method further includes generating a safety parameter for the first user that is indicative of a presence and a positioning of a safety device of the first user, comparing the safety parameter with a validation threshold, and generating an alert signal in an instance in which the safety parameter fails to satisfy the validation threshold.

US Patent Pub. No. 2023/0230379 for Safety compliance system and method by inventors Chaudhry et al., filed Jan. 19, 2022 and published Jul. 20, 2023, is directed to a computer implemented method to detect compliance with safety requirements within a monitored environment. The method includes receiving at least one image of a monitored environment, analyzing the at least one image to detect one or more objects, analyzing the detected object and data corresponding to the monitored environment to determine that at least one characteristic of the object does not comply with a safety requirement, and generating a compliance record regarding the safety requirement.

US Patent Pub. No. 2014/0307076 for Systems and methods for monitoring personal protection equipment and promoting worker safety by inventor Deutsch, filed Jun. 27, 2014 and published Oct. 16, 2014, is directed to systems and methods for monitoring and personal protection equipment promoting worker safety. According to an aspect, a system for promoting the safety of workers comprises a digital imaging device positioned to capture one or more images of a predetermined viewing area. Further, the system comprises an image processor operatively associated with the digital imaging device. The image processor is configured to determine whether a person is within the predetermined viewing area of the digital imaging device. The image processor is further configured to determine whether the person is not wearing required personal protection equipment. Additionally, the image processor is configured to generate a message or control signal in response to determining the person is within the predetermined viewing area of the digital imaging device and determining the person is not wearing the required personal protection equipment.

US Patent Pub. No. 2024/0281954 Video analytics for industrial floor setting by inventors Osman et al., filed Feb. 20, 2024 and published Aug. 22, 2024, is directed to safety non-compliance and, simultaneously, productivity metrices which are computed and tracked. Objects of interest (such as technicians, tools, cranes, slings, gloves, assets) are identified and tracked from real time streams of cameras through the application of several filtration processes (boundary based, aspect-ratio based, intersection-over-union based, dice coefficient-based, and custom model bounding box filtration techniques) and are then projected onto a 2D homographic map which localizes their position. The localized position is filtered using custom time series and frequency-based filters and aggregated over a set of defined time ranges to obtain productivity and safety KPIs. Non-compliance detections are flagged with video recorded for the given time duration and anonymized with custom processes to ensure data privacy. Productivity KPIs are represented in a dashboard with readings collected at different time intervals like hourly, daily, weekly and monthly.

US Patent Pub. No. 2023/0410526 for Video analytic worker safety monitoring system for workplace hazards by inventors Sonawane et al., filed May 27, 2022 and published Dec. 21, 2023, is directed to a video analytic worker safety monitoring system including at least one video camera having a field of view including a defined safety zone in a workplace, the defined safety zone including or being proximate to a workplace hazard such as an electrical hazard, a machine hazard, or a medical procedure hazard. An image processor receives a video feed from the at least one camera, wherein the image processor is configured to, based on image analysis of the received video feed, detect worker safety deficiency events.

US Patent Pub. No. 2024/0346417 for A method of controlling site safety operations based on PPE compliance by inventors Ryle et al., filed Feb. 1, 2024 and published Oct. 17, 2024, is directed to a computer-implemented method of controlling safety operations at a designated site associated with Personal Protective Equipment (PPE) requirements. The method comprises: receiving sensor data from a sensor system monitoring the site; detecting an individual at the site based on the sensor data; identifying one or more items of PPE present on the individual based on the sensor data; determining a compliance score associated with the individual based, at least in part, on the one or more identified items of PPE and a PPE checklist associated with the designated site, the PPE checklist comprising one or more prescribed items of PPE; comparing the compliance score to a safety threshold; and controlling one or more safety operations at the site in dependence on the comparison between the determined compliance score and the safety threshold.

US Patent Pub. No. 2020/0202471 for Personalized display of real-time safety information of an industrial environment by inventors Barak et al., filed Mar. 5, 2020 and published Jun. 25, 2020, is directed to methods and systems for providing different real-time safety information at a plurality of locations within an industrial environment. The methods and systems include updating a common real-time events overview report based on received information; processing the common events overview report to identify a safety-related threat affecting at least one task associated with the industrial environment; identifying at least one employee and a safety supervisor associated with the at least one task; generating a first display derived from the common events overview report, wherein the first display includes information for assisting the at least one employee to deal with the identified safety-related threat; and generating a second display derived from the common events overview report, wherein the second display includes information for assisting the safety supervisor to deal with the identified safety-related threat, wherein the second display differs from the first display.

US Patent Pub. No. 2023/0324873 for Systems and Methods for Improving Workplace Safety Via Machine Learning Applied to Lidar and Vision Systems Deployed in a Workplace by inventor Bowers, filed Apr. 12, 2023 and published Oct. 12, 2023, is directed to systems and methods for identifying and reducing workplace safety risks using computer vision, lidar, and machine learning. Sensor information is transferred to an AI server that identifies people, objects, powered industrial vehicles and other items of interest along with their locations over time. This information is gathered to identify infrequent but dangerous situations that may lead to serious and fatal accidents, such forklift collisions with human workers. This data may be used, for example, to identify near miss situations and allow safety personnel to institute risk mitigation measures, and/or to train an AI/ML model to predict the travel paths of moving objects in real time and warn workers of impending potential collisions and other dangerous situations.

U.S. Pat. No. 11,645,600 for Managing apparel to facilitate compliance by inventors Daley et al., filed Apr. 20, 2020 and issued May 9, 2023, is directed to a system, program product, and method for managing apparel to facilitate compliance through a cognitive system, i.e., using an artificial intelligence (AI) platform to dynamically analyze the apparel donned by individuals to determine compliance with established apparel compliance practices and provide suggestions for overcoming non-compliance. The determinations of non-compliance are accompanied with respective risk factors. The system, program product, and method disclosed herein facilitate leveraging written requirements processed by natural language processing (NLP) for the donning of apparel that includes proper clothing articles and accessories, as well as associated requirements of clothing articles and accessories that are not appropriate for the respective conditions.

U.S. Pat. No. 12,159,255 for Automatic barcode based personal safety compliance system by inventors Bean et al., filed Dec. 5, 2022 and issued Dec. 3, 2024, is directed to an automatic system and processes for monitoring the use of personal protective equipment in a work space. The system includes barcodes attached to the personal protective equipment. The operation of the system involves capturing images of the work space and detecting human form objects and barcode objects in the images. The system and processes further involve calculating the probability that a user is wearing all personal protective equipment in accordance with safety rules applicable to the work space. In some implementations, the system and processes may be used to track personal protective equipment and other objects in a work space. Accordingly, the system and processes may be used to prevent or limit the occurrence of accidents, incidents and/or injuries in hazardous work environments.

US Patent Pub. No. 2022/0284566 for Computer-vision based workplace safety by inventors Starr et al., filed Mar. 7, 2022 and published Sep. 8, 2022, is directed to a method, including: obtaining, using one or more sensor systems, sensor data for one or more persons in an environment comprising machinery; analyzing, using a processor, the sensor data using a trained model to identify the one or more persons and an associated time series of actions; determining, using the associated time series of actions, if the one or more persons are engaging in behavior indicative of an unsafe practice; and thereafter presenting safety information to a visual display system, connected software system or other decision support tool.

US Patent Pub. No. 2023/0072434 for Vision-based safety monitoring and/or activity analysis by inventors Zhang et al., filed Jul. 26, 2022 and issued Mar. 9, 2023, is directed to a vision-based object perception system for activity analysis, safety monitoring, or both. Embodiments of the perception subsystem detect multi-class objects (e.g., construction machines and humans) in real-time while estimating the poses and actions of the detected objects. Safety monitoring embodiments and object activity analysis embodiments may be based on the perception result. To evaluate the performance of embodiments, a dataset was collected including multi-class of objects in different lighting conditions with human annotations. Experimental results show that the proposed action recognition approach outperforms the state-of-the-art approaches on top-1 accuracy by about 5.18%.

SUMMARY OF THE INVENTION

The present invention relates to a compliance monitoring system, and more specifically to a safety compliance, identification, and security monitoring system including unmanned aerial vehicle (UAV) technology.

It is an object of this invention to provide an integrated safety compliance, identification, and security monitoring system, operable to include a UAV device.

In one embodiment, the present invention includes a safety compliance, identification, and security monitoring system, including at least one monitoring device including an image capturing device, and a casing, an unmanned aerial vehicle (UAV), a physical unique identifier tag, a database, and a computer system, wherein the casing covers the image capturing device, wherein the casing is attached to the UAV, wherein the UAV is in network communication with the at least one monitoring device, wherein the database is operable to store identification information, wherein the identification information includes identities of people who are authorized to access a predefined area, required safety equipment information for the predefined area, a unique identifier code associated with the physical unique identifier tag, wherein the at least one monitoring device is operable to detect the physical unique identifier tag on an object associated with a person in the predefined area, wherein the at least one monitoring device transmits data for the physical unique identifier tag to the computer system, wherein the computer system searches the database for the identification information associated with the physical unique identifier tag, wherein the image capturing device records an image of the person and transmits the image to the computer system, wherein the computer system analyzes the image and identifies safety equipment used by the person, wherein the computer system compares the identified safety equipment to the required safety equipment information to determine whether a required safety equipment condition is fulfilled, wherein the computer system is operable to generate a report, including the image and a date and a time of image capture, wherein when the computer system determines the person is missing a required safety equipment, the computer system provides a notification, and wherein the at least one monitoring device travels in a scheduled path around the predefined area.

In another embodiment, the present invention includes a safety compliance, identification, and security monitoring system, including at least one monitoring device including an image capturing device, at least one sensor, and a casing, an unmanned aerial vehicle (UAV), a physical unique identifier tag, a database, and a computer system, wherein the UAV is configured to receive the monitoring device, wherein the database is operable to store identification information, wherein the identification information includes identities of people who are authorized to access a predefined area, required safety equipment information for the predefined area, a unique identifier code associated with the physical unique identifier tag, wherein the at least one monitoring device is operable to detect the physical unique identifier tag on an object associated with a person in the predefined area, wherein when the at least one monitoring device detects the physical unique identifier tag, the image capturing device captures an image of the person, wherein the computer system receives the data of the physical unique identifier tag and the image of the person, wherein computer system accesses from the database the identification information associated with the physical unique identifier tag, wherein the computer system analyzes the image and identifies safety equipment used by the person, wherein the computer system compares the identified safety equipment to the required safety equipment information to determine whether a required safety equipment condition is fulfilled, wherein the computer system is operable to generate a report, including the image and a date and a time of image capture, wherein when the computer system determines the person is missing a required safety equipment, the computer system provides a notification, and wherein the at least one monitoring device travels in a scheduled path around the predefined area.

In yet another embodiment, the present invention includes a method for safety compliance, including storing identification information in a database, wherein the identification information includes identities of people who are authorized to access a predefined area, required safety equipment information for the predefined area, and a unique identifier code associated with a physical unique identifier tag, detecting the physical unique identifier tag by at least one monitoring device, recording an image of a person carrying the physical unique identifier tag, transmitting data of the physical identifier tag and the image to a computer system, searching the database for the identification information associated with the physical unique identifier tag, analyzing the image and identifying safety equipment used by the person, comparing the identified safety equipment to the required safety equipment information to determine whether a required safety equipment condition is fulfilled, and generating a report, including the image and a data and time of image capture, wherein the at least one monitoring device travels in a scheduled path around the predefined area.

These and other aspects of the present invention will become apparent to those skilled in the art after a reading of the following description of the preferred embodiment when considered with the drawings, as they support the claimed invention.

DETAILED DESCRIPTION

Figure 1:
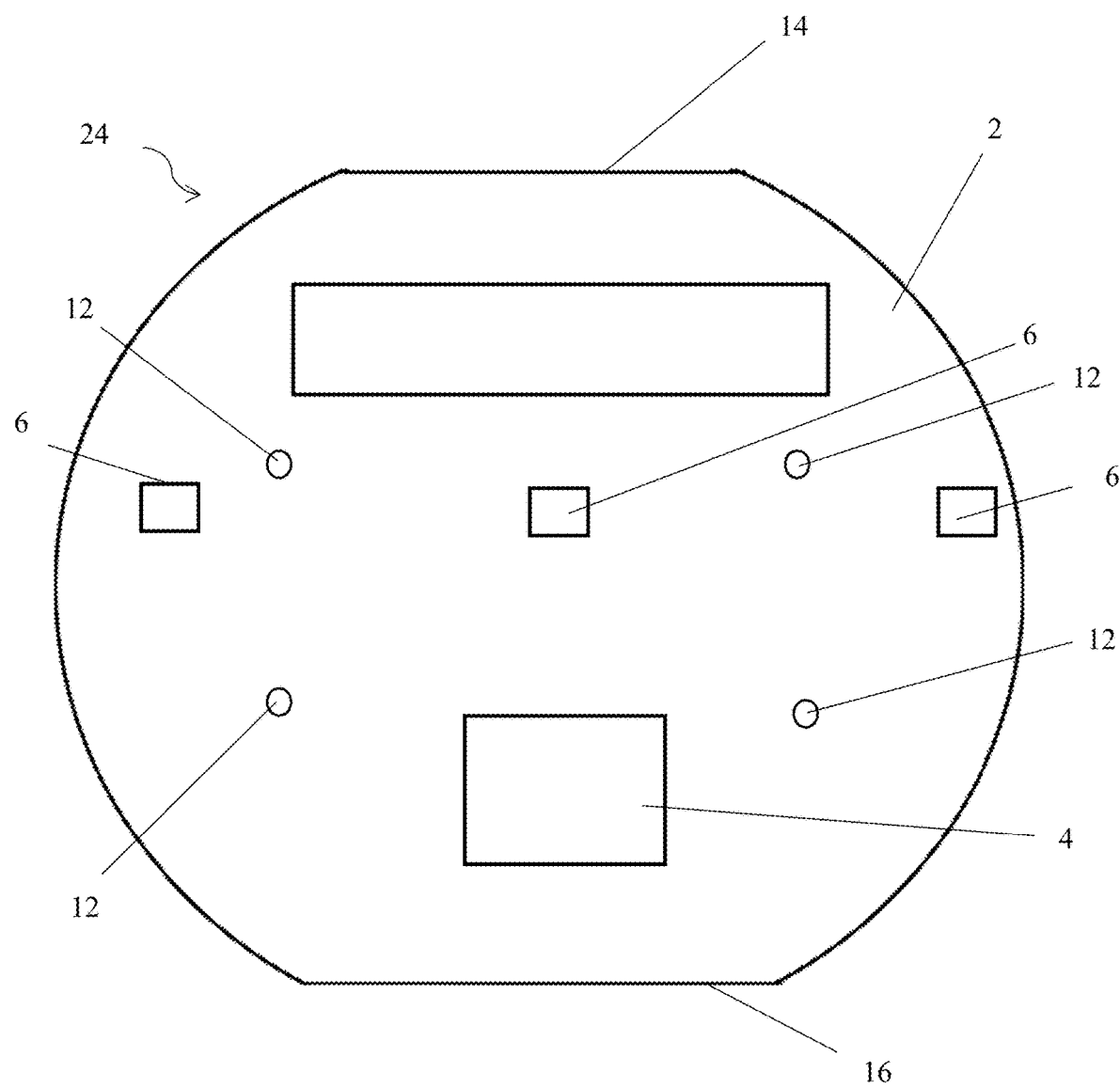
FIG. 1 illustrates an orthogonal front view of the monitoring device according to one embodiment of the present invention.

The present invention is generally directed to a safety compliance, identification, and security monitoring system including unmanned aerial vehicle (UAV) technology.

In one embodiment, the present invention includes a safety compliance, identification, and security monitoring system, including at least one monitoring device including an image capturing device and a casing, an unmanned aerial vehicle (UAV), a physical unique identifier tag, a database, and a computer system, wherein the casing covers the image capturing device, wherein the casing is attached to the UAV, wherein the UAV is in network communication with the at least one monitoring device, wherein the database is operable to store identification information, wherein the identification information includes identities of people who are authorized to access a predefined area, required safety equipment information for the predefined area, a unique identifier code associated with the physical unique identifier tag, wherein the at least one monitoring device is operable to detect the physical unique identifier tag on an object associated with a person in the predefined area, wherein the at least one monitoring device transmits data for the physical unique identifier tag to the computer system, wherein the computer system searches the database for the identification information associated with the physical unique identifier tag, wherein the image capturing device records an image of the person and transmits the image to the computer system, wherein the computer system analyzes the image and identifies safety equipment used by the person, wherein the computer system compares the identified safety equipment to the required safety equipment information to determine whether a required safety equipment condition is fulfilled, wherein the computer system is operable to generate a report, including the image and a date and a time of image capture, wherein when the computer system determines the person is missing a required safety equipment, the computer system provides a notification, and wherein the at least one monitoring device travels in a scheduled path around the predefined area.

In another embodiment, the present invention includes a safety compliance, identification, and security monitoring system, including at least one monitoring device including an image capturing device, at least one sensor, and a casing, an unmanned aerial vehicle (UAV), a physical unique identifier tag, a database, and a computer system, wherein the UAV is configured to receive the monitoring device, wherein the database is operable to store identification information, wherein the identification information includes identities of people who are authorized to access a predefined area, required safety equipment information for the predefined area, a unique identifier code associated with the physical unique identifier tag, wherein the at least one monitoring device is operable to detect the physical unique identifier tag on an object associated with a person in the predefined area, wherein when the at least one monitoring device detects the physical unique identifier tag, the image capturing device captures an image of the person, wherein the computer system receives the data of the physical unique identifier tag and the image of the person, wherein computer system accesses from the database the identification information associated with the physical unique identifier tag, wherein the computer system analyzes the image and identifies safety equipment used by the person, wherein the computer system compares the identified safety equipment to the required safety equipment information to determine whether a required safety equipment condition is fulfilled, wherein the computer system is operable to generate a report, including the image and a date and a time of image capture, wherein when the computer system determines the person is missing a required safety equipment, the computer system provides a notification, and wherein the at least one monitoring device travels in a scheduled path around the predefined area.

In yet another embodiment, the present invention includes a method for safety compliance, including storing identification information in a database, wherein the identification information includes identities of people who are authorized to access a predefined area, required safety equipment information for the predefined area, and a unique identifier code associated with a physical unique identifier tag, detecting the physical unique identifier tag by at least one monitoring device, recording an image of a person carrying the physical unique identifier tag, transmitting data of the physical identifier tag and the image to a computer system, searching the database for the identification information associated with the physical unique identifier tag, analyzing the image and identifying safety equipment used by the person, comparing the identified safety equipment to the required safety equipment information to determine whether a required safety equipment condition is fulfilled, and generating a report, including the image and a data and time of image capture, wherein the at least one monitoring device travels in a scheduled path around the predefined area.

None of the prior art discloses an integrated safety compliance, identification, and security monitoring system including unmanned aerial vehicle (UAV) technology.

While the present invention is not limited for use on construction and/or job sites, such sites pose several safety, security, quality, production, and logistical concerns that need to be monitored and/or addressed. For example, the consistent use of personal protective equipment (PPE), such as glasses, hard hat, safety vest, gloves, hard toe shoes, and/or safety harness, is critically important from the standpoint of both safety and quality assurance. Onsite injuries not only cause unnecessary harm, but they can delay progress and/or increase project costs. Job sites can further include several safety hazards such as tripping hazards, openings within floors through which a worker could fall, and/or structures that are not fully supported that could collapse or otherwise injure a worker.

Unauthorized access to a job site also poses both safety and security concerns. Untrained and/or unauthorized persons who trespass on a job site could become injured or they could also damage, destroy or steal valuable materials and/or equipment. Further, unauthorized access can impact production and introduce quality assurance and/or quality control issues.

Tracking which workers are onsite, their location onsite, and whether they are complying with all safety requirements also helps keep the job site safe; in particular, this helps to ensure that workers who are supposed to be onsite are and that those who are not supposed to be physically present are not onsite. Similarly, monitoring and/or creating a record of activities occurring at the job site could assist with record keeping and/or project management. Additionally, tracking and identifying workers onsite can assist in verifying production documentation, potential evacuation efforts, and monitoring controlled access locations for quality control.

Another concern that exists for construction sites is fire. Since smoke detectors are not typically installed on unfinished projects and/or those in which no electricity has been installed in the structure, fires can go undetected.

Accordingly, it is an object of the present invention to provide a system operable to detect whether a worker is present on the job site, where on the job site the worker is located, and whether the worker is wearing the mandatory personal protective equipment. It is a further object of the present invention to record which workers are present, their general location, and whether they are wearing personal protective equipment. It is a further object to notify and/or remind the worker and/or their supervisor of the need to use protective equipment.

It is a further object of the invention to detect hazards and notify workers of the hazard's existence. It is another object of the invention to provide security monitoring and/or lighting to prevent unauthorized access to the job site. It is another object of the present invention to monitor environmental factors, such as heat, fire, smoke, rain and the like, so that proper notifications and/or records of the environmental factor are operable to be made when required.

In one embodiment, the safety compliance, identification, and security monitoring system includes a database that stores identification information regarding persons who are authorized to access a predefined area, safety equipment information representing the safety equipment that the person is required to use while in the predefined area, a physical unique identifier tag associated with the identification information, a monitoring device that includes an unmanned aerial vehicle, at least one image capturing device, and a scanner operable of reading the physical unique identifier tag, and a set of computer readable instruction stored on the database that when executed by a processor causes a computer system that is in communication with the database to receive from the monitoring device an image of the person captured by the monitoring device, receive from the monitoring device an image of the physical unique identifier tag captured by the scanner, access from the database the identification information associated with the physical unique identifier tag, compare the image of the person captured by the at least one image capturing device to the safety equipment information associated with the physical unique identifier tag, determine whether the person is using all of the safety equipment associated with the safety equipment information, initiate a notification upon determining that the person is not using all of the required safety equipment, and store in the database an incident record including the image captured by the at least one image capturing device as well as the date and time that the image was captured.

Referring now to the drawings in general, the illustrations are for the purpose of describing one or more preferred embodiments of the invention and are not intended to limit the invention thereto.

FIG. 1 illustrates an orthogonal front view of the monitoring device according to one embodiment of the present invention.

In one embodiment, the safety compliance, identification, and security monitoring system includes a monitoring device 24, wherein the monitoring device 24 is operable to gather data, process data, and generate an output. In one embodiment, the monitoring device 24 is operable to receive input from a plurality of components, analyze the input received, and initiate corrective and/or responsive actions, including initiating warning messages and alerts as well as documenting industry data, individual data, and storing incident data and/or creating incident reports. In one embodiment, the monitoring device 24 is operable for conducting surveillance activities for safety and quality, including, but not limited to, production surveillance, employee and personnel tracking, tracking check-in/check-out of materials and/or equipment, and surveillance of controlled areas. In one embodiment, the safety compliance, identification, and security monitoring system is operable to provide functions, including, but not limited to, detecting heat, fire, and/or smoke, detecting adverse weather conditions, identifying unsafe behaviors performed by personnel, and identifying safety hazards or potential safety hazards.

In a preferred embodiment, the monitoring device 24 includes an image capturing device 4. In one embodiment, the image capturing device 4 is an image sensor, a wide-angle camera, a closed-circuit television (CCTV) camera, a surveillance camera, a camcorder, a digital camera, a video camera, camera phones, a night-vision camera, a 360-degree camera, a time-of-flight camera, a stationary camera, or an infrared camera. In one embodiment, the image capturing device 4 is operable to capture High Dynamic Range (HDR) images, a Low Dynamic Range (LDR) image, a High Definition (HD) image, a 4K image, a RAW image, or images or video in other formats known in the art. In one embodiment, the image capturing device 4 includes a sensor for detecting non-visible spectra light. In one embodiment, the image capturing device 4 is implemented as an integrated unit of the monitoring device 24. In one embodiment, the image capturing device 4 is a separate device.

In one embodiment, the monitoring device 24 includes a casing 2, wherein the casing 2 comprises a high-impact material (e.g., bulletproof glass or plastic). Advantageously, a high-impact casing 2 protects fragile components of the monitoring device 24. In one embodiment, the casing 2 protects the components in the monitoring device 24 from the elements. In one embodiment, the image capturing device 4 is enclosed inside the casing 2. In one embodiment, the casing 2 is substantially spherical. In one embodiment, the casing 2 includes a substantially flat base and a curved surface, wherein the casing 2 is substantially a truncated sphere. In one embodiment, the casing 2 includes at least one substantially flat surface, wherein the monitoring device 24 is operable to be free standing on the at least one substantially flat surface. In one embodiment, the casing 2 includes at least two substantially flat surfaces, wherein one of the at least two substantially flat surfaces is a base. In one embodiment, the casing 2 includes a top surface and a bottom surface, wherein both the top surface and the bottom surface are substantially flat. In one embodiment, the casing 2 provides a streamline profile for the monitoring device 24 to reduce drag and improve aerodynamic properties of the monitoring device 24. In one embodiment, the casing 2 is operable to be divided into at least two parts, wherein at least one component inside the casing 2 is operable to be serviced, replaced, and/or handled.

In one embodiment, the casing 2 is transparent, wherein the image capturing device 4 is operable to function within the casing 2. Advantageously, a transparent casing provides for a wide-angle camera or 360-degree video camera to capture videos and/or still shots from within the casing 2 without impeding the lens. In one embodiment, the casing 2 includes a transparent region and an opaque region. In one embodiment, the casing 2 is tinted. A tinted casing is operable to obscure the direction the image capturing device 4 is facing. In one embodiment, the casing 2 comprises a photochromic material. In one embodiment, the casing 2 is electrochromic, wherein applying a voltage changes the opacity of the casing 2. In one embodiment, a film is applied to the casing 2 to add a tint.

In one embodiment, the casing 2 is operable to be fitted with a handle 14. The handle 14 is usable by a user for the transport of the monitoring device 24. In one embodiment, the handle 14 is removably attachable to the casing 2. Non-limiting examples include screws, fasteners, rivets, pins, and bolts. In one embodiment, the monitoring device 24 includes a mounting attachment 16 to attach and/or secure the monitoring device 24 to a fixed position at the job site. In one embodiment, the mounting attachment 16 attaches the monitoring device 24 to a structure within the job site. Fixed locations provide for the image capturing device 4 to be positioned at strategic locations on the job site. For example, the monitoring device 24 is operable to be mounted at the entrance of a controlled area, observing if unauthorized personnel enter the area. In one embodiment, the fixed position provides for an unobstructed view of a region of the job site. The region is operable to be a location requiring extra security, an area containing expensive or sensitive equipment, or highly trafficked areas, as non-limiting examples. In one embodiment, the monitoring device 24 is operable to be mounted to a pillar. In one embodiment, the monitoring device 24 is operable to be mounted on a tripod. In one embodiment, the monitoring device 24 is configured to be attached to an unmanned aerial vehicle (UAV). In one embodiment, the monitoring device 24 includes anti-vibration rubber pads to minimize the effect of vibrations (e.g., from heavy machinery, road and rail traffic, etc.). In one embodiment, the monitoring device 24 is operable to be mounted to a ceiling.

In one embodiment, the monitoring device 24 includes at least one light 12. In one embodiment, the monitoring device 24 includes a plurality of lights 12, wherein the plurality of lights 12 are located around the monitoring device 24. In one embodiment, the plurality of lights 12 are located inside the casing 2. In one embodiment, the plurality of lights 12 are attached outside the casing 2. In one embodiment, the plurality of lights 12 are distributed substantially evenly around the casing 2. In one embodiment, the plurality of lights 12 are attached inside the casing 2. In one embodiment, at least two of the plurality of lights 12 are concentrated in a region of the casing 2, wherein the at least two of the plurality of lights 12 are operable to create a spotlight. In one embodiment, at least one light is operable to illuminate a path in front of the monitoring device 24, in a manner similar to a vehicle's headlights. In one embodiment, at least one light is operable to provide directional lighting. In one embodiment, at least one light is operable to provide diffuse lighting. In one embodiment, the plurality of lights 12 are operable to be LEDs, operating in the visible spectrum, infrared spectrum, or any common range in the electromagnetic spectrum known by one of ordinary skill in the art. In one embodiment, at least one light is operable to be a status indicator. In one embodiment, at least one light is colored. In one embodiment, at least one light is operable to change colors. In one embodiment, at least one light is operable to blink, flash, pulse, or otherwise illuminate in various patterns.

In one embodiment, the monitoring device 24 includes at least one speaker. In one embodiment, the at least one speaker is integrated with or attached to the monitoring device 24. In one embodiment, the monitoring device 24 is in network connection to at least one speaker, wherein the at least one speaker is on the job site. In one embodiment, at least one speaker is operable to be in a portable user device. In one embodiment, a speaker is operable to broadcast an audible alarm. In one embodiment, the alarm is operable is a sound between about 60 decibels to about 120 decibels. In one embodiment, the alarm is a sound at about 75 decibels or more, about 100 decibels or more, and any range between and including the sound levels provided. In one embodiment, the at least one speaker is operable to broadcast audible messages.

In one embodiment, the monitoring device 24 includes a plurality of sensors 6, wherein the plurality of sensors 6 are operable to capture data. In one embodiment, the plurality of sensors 6 are distributed evenly on the casing 2. In one embodiment, the plurality of sensors 6 are attached to the outside surfaces of the casing 2. In one embodiment, the plurality of sensors 6 are attached to the inner surfaces of the casing 2. In one embodiment, at least one of the plurality of sensors 6 is embedded in the casing 2. In one embodiment, the plurality of sensors 6 are distributed throughout the monitoring device 24, wherein the plurality of sensors 6 provide substantially 360 degree coverage of the monitoring device 24. In one embodiment, the monitoring device 24 is positioned relative to a region of interest, wherein the plurality of sensors 6 are operable to provide coverage of the region of interest. In one embodiment, at least one of the plurality of sensors 6 is operable to move to a different position from the initial position. In one embodiment, the at least one sensor is operable to retract and/or extend. In one embodiment, the at least one sensor is operable to tilt in place. In one embodiment, the plurality of sensors 6 include, but are not limited to, a scanner, a motion sensor, an acceleration sensor, an electromagnetic sensor, a location sensor, a sound sensor, a temperature sensor, a humidity sensor, an object sensor, an air pressure sensor, a precipitation sensor, an anemometer, a light sensor, an air quality sensor, a chemical sensor, an ammeter, a voltmeter, a power meter, a magnetic field sensor, an orientation sensor, and/or a smoke detector.

In one embodiment, at least one sensor is operable to process data. In one embodiment, data from the at least one sensor is transmitted to a computer system, wherein the computer system processes the data. Processing is operable to be carried out by a computing device, a remote server, a cloud computing system, or any known solution in the art. In one embodiment, at least one sensor records and processes data in real-time. In one embodiment, at least one sensor records data at set time intervals (e.g., seconds, minutes, hours, days). In one embodiment, at least one sensor records data at set times (e.g., the start of a work shift, the end of a work shift). In one embodiment, at least one sensor records data after an event trigger, wherein the monitoring device 24 identifies an event trigger. Non-limiting examples of events include an unqualified individual working with dangerous tools, an individual using improper tools for a task, an individual not wearing appropriate PPE, lighting conditions become inadequate, an individual eating and/or drinking in restricted areas, unauthorized individuals in restricted areas, hazardous materials not safely contained, an event damaging tools and/or equipment, and reaching an alert limit with environmental monitoring. Events are operable to lead to quality control issues, including, but not limited to, mislabeled raw materials, mislabeled work-in-progress product, mislabeled final product, mislabeled equipment and tools, unidentified raw materials, unidentified work-in-progress product, unidentified product, unidentified equipment and tools, unidentified hazardous materials, misplaced tools and/or equipment, unqualified personnel in restricted areas or controlled environments, identification of pests in restricted areas or controlled environments, and use of unvalidated equipment.

In one embodiment, the monitoring device 24 is in network connection with at least one of the plurality of sensors 6. In one embodiment, the monitoring device 24 is operable to connect with a network of sensors 6. In one embodiment, the monitoring device 24 is in network communication with other devices within the network and/or on the job site, wherein the monitoring device 24 is operable to receive information from the devices. In one embodiment, the safety compliance, identification, and security monitoring system includes a plurality of monitoring device 24s, wherein the plurality of monitoring device 24s are in network communication.

In one embodiment, the plurality of sensors 6 includes a scanner, operable to detect a unique identifier tag associated with a worker. Non-limiting examples of unique identifier tags include physical identification (ID), scannable stickers or labels (e.g., barcodes, QR codes), location chips (e.g., RFID chip), and magnetic cards. In one embodiment, the unique identifier tag includes a scannable portion that permits a scanner and/or reader to obtain information from the unique identifier tag. In one embodiment, the safety compliance, identification, and security monitoring system is operable to generate the physical ID. In one embodiment, the safety compliance, identification, and security monitoring system is operable to modify and/or update the physical ID.

In one embodiment, the plurality of sensors 6 includes a motion sensor, wherein upon detection of motion, the safety compliance, identification, and security monitoring system initiates a response. Non-limiting response examples include the initiating video capture, sounding an alarm, turning on at least one light, activating at least one of the plurality of sensors 6, and any combination thereof. In one embodiment, the image capturing device 4 is configured to initiate video capture. In one embodiment, the image capturing device 4 is configured to capture and send a live feed of the video to the computing system. In one embodiment, the image capturing device 4 stores captured video data in a data storage repository.

In one embodiment, the plurality of sensors 6 include a vibration sensor, wherein the vibration sensor is operable to detect seismic vibrations. In one embodiment, the monitoring device 24 is in network communication with the vibration sensor. In one embodiment, when the vibration sensor detects a natural phenomenon operable to damage a structure being built, the monitoring device 24 is operable to provide a visual and/or audio notice alerting personnel at the job site of the natural phenomenon. In one embodiment, the monitoring device 24 is operable to provide a visual and/or audio notice when the vibration sensor detects vibrations at or over a threshold limit. Examples of natural phenomenon include earthquakes, collapsing of a sink hole, and high winds. In one embodiment, the monitoring device 24 is further operable to notify at least one individual and/or organization. As a non-limiting example, the monitoring device 24 is operable to notify a project manager, supervisor, and/or first responders of an emergency.

In one embodiment, the plurality of sensors 6 includes a heat sensor, smoke detector, and/or humidity sensor. These sensors 6 are operable to be used for both detecting fires as well as unsafe working conditions. In one embodiment, the monitoring device 24 is programmable to start an alarm if the temperature rose to a level that would indicate a fire has started and/or if smoke is detected. In one embodiment, the safety compliance, identification, and security monitoring system is further operable to send an emergency notification, wherein the emergency notification is sent to the appropriate personnel (e.g., project manager, supervisor, first responders, or a combination thereof). In another embodiment, the device is operable to initiate a heat advisory and/or reminder to hydrate when the temperature and/or humidity make working conditions potentially unsafe. In one embodiment, the safety compliance, identification, and security monitoring system is further operable to send a notification to the appropriate personnel (e.g., project manager, supervisor) when the heat and/or humidity exceed predetermined levels. When such working conditions occur, a project manager and/or supervisor can monitor personnel onsite for hyperthermia symptoms.

In one embodiment, the monitoring device 24 includes a battery. In one embodiment, the battery is rechargeable. In one embodiment, the monitoring device 24 is operable to be charged in a charging station. In one embodiment, the monitoring device 24 includes an external power source, including, but not limited to, a solar charging system and external plug. In one embodiment, the monitoring device 24 is operable to be recharged by replacing the battery. In one embodiment, the monitoring device 24 includes a backup battery. In one embodiment, the battery is a smart battery operable to transmit an internal state (e.g., the remaining charge level) of the battery to the monitoring device 24.

Figure 2:
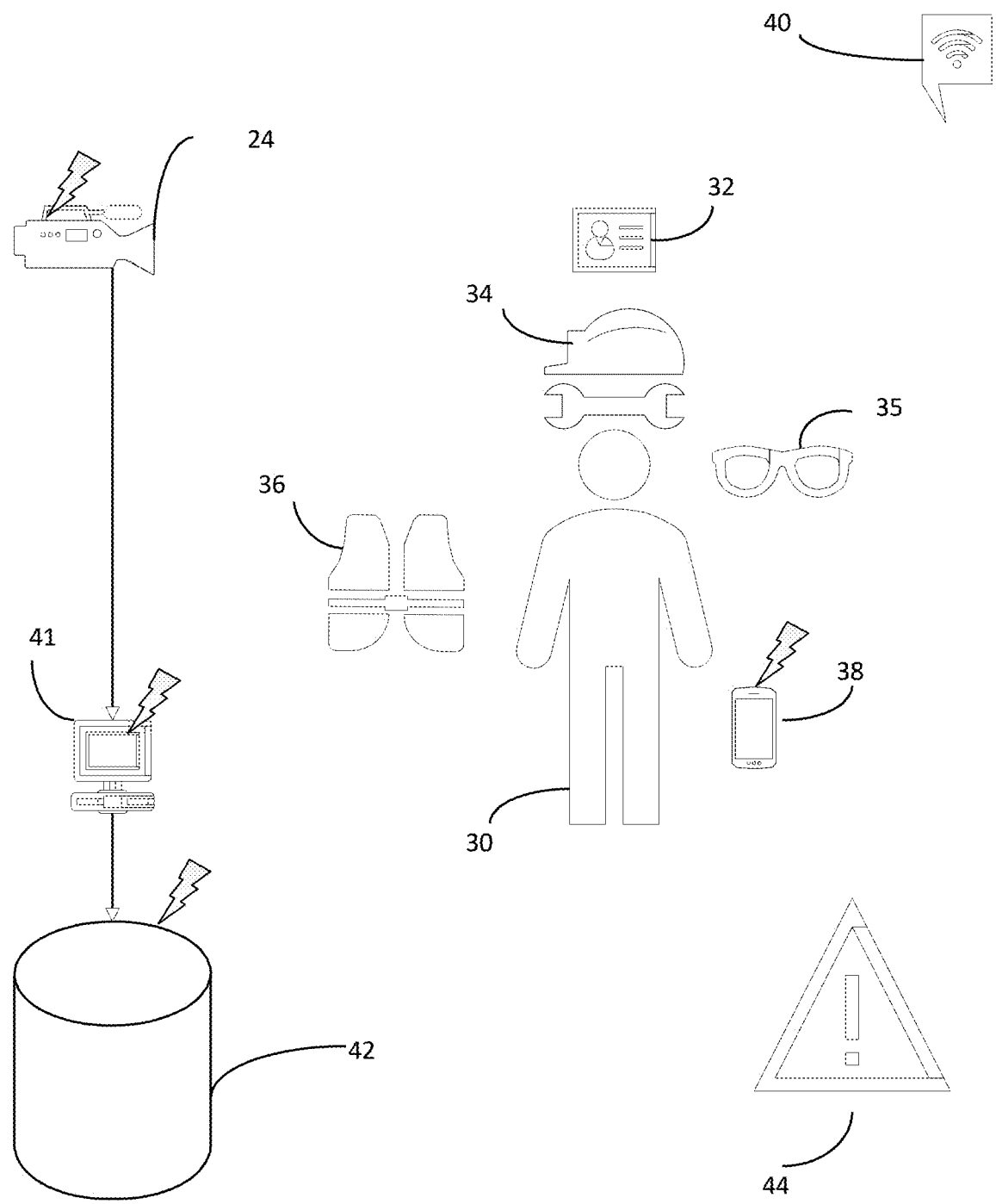
FIG. 2 is a schematic of an embodiment of the present invention during use.

FIG. 2 is a schematic of an embodiment of the present invention during use. In one embodiment, the monitoring device 24 is operable to detect a unique identifier tag 32 and identify a worker 30. In one embodiment, the monitoring device 24 is configured to attach to an unmanned aerial vehicle (UAV) for improved mobility and/or vantage points.

In one embodiment, the monitoring device 24 is operable to be in communication with a computer system 41, wherein the computer system 41 is operable to store and analyze information input by a user and/or collected by the monitoring device 24. In one embodiment, the computer system 41 is in communication with a database 42, wherein collected information is stored in the database 42. In one embodiment, the monitoring device 24, computer system 41, and database 42 are operable to be in wired or wireless communications via a wireless network 40, local area network, wide area network, or by any other means generally known in the art.

In one embodiment, the monitoring device 24 is operable to use a cellphone or other transponder 38 carried by a worker 30 to determine the location of the worker 30. In one embodiment, the cellphone or other transponder 38 is connected to the same wireless network 40 as the monitoring device 24, wherein the location of the worker 30 in reference to the monitoring device 24 and/or the Wi-Fi router and/or source of the wireless signal 40 is operable to be determined. In another embodiment, the monitoring device 24 is operable to communicate with the cellphone and/or transponder 38 to retrieve GPS information that is determined by and stored on the cell phone and or transponder 38.

In one embodiment, the monitoring device 24 is operable to detect and identify PPE on a worker 30. In one embodiment, PPE includes, but is not limited to, gloves, foot and eye protection, protective hearing devices, hard hats, respirators, and full body suits. In one embodiment, the monitoring device 24 is operable to identify and determine whether a worker 30 is wearing a hard hat 34, safety glasses 35, safety vest 36. In one embodiment, violations are recorded and reported by the monitoring device 24. In one embodiment, the monitoring device 24 is operable to automatically detect hazard and/or potentially dangerous conditions 44, wherein the monitoring device 24 is operable to issue a warning.

In one embodiment, identifying information regarding each worker 30 stored in a database 42, wherein each worker 30 is assigned a unique identifier code. Non-limiting examples include name, phone number, cell phone device and/or carrier information, emergency contact information, employer information, supervisor contact information, statement of work information (e.g., nature of work to be performed), date of work to be performed, shift hours, title and/or position, role responsibilities, required PPE, and training records. In one embodiment, when a worker 30 enters the detection range of the monitoring device 24, the monitoring device 24 is operable to detect the unique identifier tag 32 of the worker 30, and wherein the monitoring device 24 records the date, time, and/or location of the worker 30 at the time of detection. In one embodiment, when the monitoring device 24 is unable to determine the identity of a worker 30, the monitoring device 24 sends an alert to appropriate personnel (e.g., project manager, supervisor). In one embodiment, the alert includes an image captured of the unidentified worker 30.

In one embodiment, the safety compliance, identification, and security monitoring system includes a computer system 41 operable to store and analyze information input by a user and/or collected by the monitoring device 24. In one embodiment, the monitoring device 24 is in network connection with the computer system 41. In one embodiment, the computer system 41 is in communication with a database 42 where collected information is stored. In one embodiment, collected information is processed before storage in the database 42. In one embodiment, the computer system 41 further processes the collected information and updates the database 42 with the processed information.

In one embodiment, the computer system 41 is in communication with a database 42. In one embodiment, information regarding the job site is operable to be stored in a database 42, including, but not limited to, the location of the job site, the nature of the project, the owner of the land/building, each of the contractors involved, the project budget, project timeline (e.g., start date and end date), and a project name. In one embodiment, a job site or project is operable to be provided with a unique account along with a unique account number. In one embodiment, the account information includes a unique identification number corresponding to a monitoring device 24 (device ID) for each of the monitoring device 24s at the job site. In one embodiment, the account information includes the corresponding location of each of the monitoring device 24s at the job site. In one embodiment, the computer system 41 is operable to extract information from an enterprise resource planning (ERP) system, including, but not limited to equipment identification numbers, equipment calibration records, and equipment maintenance records. In one system, the computer system 41 uses an application programming interface (API) to connect with an ERP system.

In one embodiment, the computer system 41 is operable to store administrator and permissions information such as login credentials and contact information for the system administrator. In one embodiment, the computer system 41 is operable to manage permissions.

In one embodiment, the safety compliance, identification, and security monitoring system is operable to process and/or transform the image data with an internal processor. In another embodiment, the system is operable for remote image processing. In yet another embodiment, the monitoring device 24 is operable for wired communication with an external processor (e.g., a computer, a tablet) for image processing. In one embodiment, the safety compliance, identification, and security monitoring system is operable to execute image processing routines, including, but not limited to, edge detection, motion detection, facial recognition, threat assessment, reportable event. In one embodiment, the safety compliance, identification, and security monitoring system is operable to detect if a worker 30 is wearing the required PPE associated with the worker 30. In such an embodiment, the system is operable to use the unique identifier tag 32 to identify the worker 30. In one embodiment, the safety compliance, identification, and security monitoring system is operable to detect and identify injuries occurring onsite.

In one embodiment, the safety compliance, identification, and security monitoring system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The safety compliance, identification, and security monitoring system is operable to use any of the aforementioned learning techniques alone or in combination. In one embodiment, the plurality of learning techniques is for image processing.

In one embodiment, the monitoring device 24 is operable to identify a worker 30 within the viewing range of the monitoring device 24. In one embodiment, the monitoring device 24 identifies a worker 30 via the image capturing device and image processing techniques. In one embodiment, the monitoring device 24 identifies a worker 30 via the scanner, wherein the scanner detects a unique identifier tag 32 associated with a worker 30. In one embodiment, the monitoring device 24 identifies a worker 30 using a combination of an image capturing device and at least one additional sensor. In one embodiment, when the monitoring device 24 identifies a worker 30, the monitoring device 24 is operable to identify the location of the worker 30 within the job site, creating location data of the worker 30. In one embodiment, location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router. In one embodiment, the monitoring device 24 is operable to geolocate at least one worker 30 present at the job site and/or within a geolocation fence surrounding the job site. In one embodiment, the monitoring device 24 uses a cell phone or other transponder 38 carried by the worker 30 to geolocate the worker 30. For projects involving contractors, geolocation features allow a project manager to monitor, track, and record the number and identity of the contractors on the job site. Such capabilities can help manage the project schedule to ensure that each contractor is where he/she is supposed to be at the appropriate time. The system is operable to generate records for contractors who are tardy or do not show up for purposes of contract enforcement.

In one embodiment, the monitoring device 24 is operable to detect whether a worker 30 is wearing required PPE that is associated with the worker 30. The system is operable to use the unique identifier tag 32 to identify the worker 30 and determine what PPE information is associated with the worker 30 by searching the database 42. In one embodiment, the device is operable to determine by visual inspection whether the worker 30 is wearing a hard hat 34, safety glasses 35, safety vest 36, and any other safety equipment required. In another embodiment, the device is operable to determine whether the minimum level of safety equipment required of any worker 30 present on the job site is being worn. Thus, identification of the worker 30 by the unique ID tag 32 is not required.

In one embodiment, when a worker 30 is not wearing the proper PPE, the monitoring device 24 is operable to alert the worker 30 through a notification. Non-limiting examples of a notification include flashing lights, an announcement made through built-in speakers or through wireless speakers that are in communication with the monitoring device 24, or any other notification that is likely to catch the attention of the worker 30. Alternatively, the notification is operable to include a notification to at least one electronic device of the worker, such as a text message or call to the at least one electronic device of the worker. In one embodiment, the monitoring device 24 is operable to record the instance by storing a video or still photo of the worker 30 along with the date and time of the infraction. In one embodiment, the device is operable to notify appropriate personnel (e.g., project manager, supervisor) by way of a text, email, or other notification that is operable to be wirelessly transmitted to a communication device, wherein the communication device is located in a data command center and/or project management station. In an alternate embodiment, the communication device is portable and operable to be carried by the appropriate personnel (e.g., project manger, supervisor) while on the job site.

In one embodiment, the monitoring device 24 is operable to provide periodic reminders, in a desired language, to effectively communicate to personnel onsite. In one embodiment, reminders include, wearing PPE, staying hydrated, avoiding known hazards, and the like. In one embodiment, the notification is operable to be in visual or auditory form.

In one embodiment, the notifications are announced on regular, predetermined intervals. In one embodiment, the notifications are announced on a random schedule.

In one embodiment, the safety compliance, identification, and security monitoring system is operable to track time and attendance of workers 30 on a job site. In one embodiment, the monitoring device 24 is operable to detect workers 30 entering, exiting, and on their break and record time stamps of these events. In one embodiment, the safety compliance, identification, and security monitoring system is operable to perform worker time-tracking and submit records to a payroll system. In one embodiment, the safety compliance, identification, and security monitoring system is operable to generate reports of attendance and/or timekeeping. In one embodiment, the safety compliance, identification, and security monitoring system is operable to calculate the time it takes to complete tasks, projects, and/or jobs.

In one embodiment, the monitoring device 24 is operable to monitor personnel entering and leaving the job site. In one embodiment, the monitoring device 24 is operable to monitor personnel entering and leaving a geolocation fenced area. In one embodiment, the monitoring device 24 is operable to monitor personnel entering or leaving a controlled area, wherein only authorized and/or trained personnel are allowed into the controlled area. In one embodiment, when unauthorized and/or untrained personnel enter, the monitoring device 24 issues a warning (e.g., flashing lights or a verbal command). In one embodiment, the safety compliance, identification, and security monitoring system is further operable to send a notification to the appropriate personnel (e.g., project manager, supervisor). In one embodiment, the safety compliance, identification, and security monitoring system generates a report to document the infraction, wherein the report includes, but is not limited to, an image of the unauthorized and/or untrained personnel, time and date of the event, and location of occurrence. In one embodiment, the monitoring device 24 is operable to track personnel routes around the job site. In one embodiment, the safety compliance, identification, and security monitoring system is operable to generate a spaghetti diagram, a visual representation using a continuous flow line tracing the path of an item or activity through a process, to identify redundancies in the work flow.

In one embodiment, the monitoring device 24 is operable to automatically detect hazards and/or potentially dangerous conditions 44, including but not limited to open elevator shafts, unfinished floors, and un unstable structure. In one embodiment, the existence of hazards 44 are operable to be identified and stored within a database 42. In one embodiment, the device is operable to issue a warning (e.g., flashing lights or a verbal command) to notify workers 30 to avoid the hazardous condition 44.

In one embodiment, when the monitoring device 24 is located near entrances and/or exits of the job site, the monitoring device 24 performs rapid screening for infectious diseases. In one embodiment, when the monitoring device 24 detects symptoms of infectious diseases, the monitoring device 24 issues a warning (e.g., flashing lights or a verbal command). In one embodiment, the verbal warning is operable to be in a desired language to effectively communicate to personnel onsite. In one embodiment, the safety compliance, identification, and security monitoring system is further operable to send a notification to the appropriate personnel (e.g., project manager, supervisor). In one embodiment, the monitoring device 24 is operable to detect when a worker 30 displays symptoms (e.g., coughing, sneezing, high fever) indicating a contagious state. The monitoring device 24 is operable to be stationed in a fixed position or moving throughout the job site. In one embodiment, the monitoring device 24 is operable to detect if a worker 30 has a high fever. In one embodiment, the monitoring device 24 uses a plurality of learning techniques to detect the presence of contagious symptoms. In one embodiment, the monitoring device 24 captures thermal images and uses image processing techniques to measure body temperature. Additional information related to image analysis of body temperature is disclosed in U.S. Pat. Nos. 11,676,270 and 11,635,331 and US Patent Publication Nos. 2023/0043342, 2020/0146557, and 2022/0146320, each of which is incorporated herein by reference in its entirety. In one embodiment, the safety compliance, identification, and security monitoring system determines if the measured body temperature is 100.4 degrees Fahrenheit (38 degrees Celsius) or above. In one embodiment, when the safety compliance, identification, and security monitoring system determines the worker 30 has a high fever, the system initiates a warning through the monitoring device 24. In one embodiment, the system is operable to send a notification to the appropriate personnel (e.g., project manager, supervisor). In one embodiment, the monitoring device 24 is operable to monitor workers 30 onsite for injuries and determine if the injury occurred onsite or not. In one embodiment, the monitoring device 24 is operable to perform biomechanical analysis of workers, wherein the biomechanical analysis includes but is not limited to gait analysis, posture (e.g., ergonomics when executing tasks at the job site), and injury prediction. In one embodiment, when the monitoring device 24 determines an injury has occurred on the job, the safety compliance, identification, and security monitoring system issues an alert to appropriate personnel (e.g., project manager, supervisor, and/or first responders). In one embodiment, the safety compliance, identification, and security monitoring system complies with Health Insurance Portability and Accountability Act (HIPPA) when recording and/or storing worker health information.

In one embodiment, when the safety compliance, identification, and security monitoring system detects the image capturing device has been obstructed, the monitoring device 24 is operable to initiate a response. In one embodiment, the monitoring device 24 reacts when the image capturing device is unable to capture images. In one embodiment, the monitoring device 24 detects when its ability to capture images has been obscured and/or impaired. In one embodiment, the monitoring device 24 responds by sending a notification to an end user (e.g., project manager, supervisor, engineer) to provide an alert of the visual impediment. In one embodiment, the monitoring device 24 provides a local notification in visual or auditory format to alert those in the area that the view of the image capturing device is being obscured. In one embodiment, the monitoring device 24 responds by moving to a second location. In one embodiment, the second location is a pre-determined region at the job site. In one embodiment, the monitoring device 24 calculates the second location within a range of the monitoring device 24 and moves to the calculated second location.

In one embodiment, the monitoring device 24 is operable to monitor tool and equipment use. In one embodiment, the monitoring device 24 is operable to use image processing to determine tool and equipment wear-and-tear and/or damage. In one embodiment, the monitoring device 24 is operable to monitor personnel using equipment and determine if additional tools/equipment are required. As a non-limiting example, the monitoring device 24 is operable to determine if more left-handed tools are required to be stocked if such tools are frequently in use and unavailable when needed. In one embodiment, the safety compliance, identification, and security monitoring system is operable to determine when replacement tools and/or equipment are needed and to issue a notification to appropriate personnel. In one embodiment, the monitoring device 24 is operable to detect mechanical issues (e.g., fluid leakage, unusual sounds, alarms, excess vibrations) related to equipment and to issue a notification to appropriate personnel. In one embodiment, the monitoring device 24 is operable to monitor raw material storage. In one embodiment, the safety compliance, identification, and security monitoring system is operable to determine when inventory is running low, wherein the system issues a notification to appropriate personnel for restocking. In one embodiment, the monitoring device 24 is operable to detect quality assurance/quality control issues (e.g., identifying non-conforming product, identification and traceability issues, training compliance issues, incomplete or late preventative maintenance activities, and/or improper storage) using image processing, wherein the safety compliance, identification, and security monitoring system is operable to generate a notification and/or record the incident in a report.

In one embodiment, the monitoring device 24 inspects a work-in-progress product, wherein the safety compliance, identification, and security monitoring system is operable to utilize a plurality of learning techniques to determine if the work-in-progress product is within specification. As a non-limiting example, the safety compliance, identification, and security monitoring system determines if the observed work-in-progress product is within dimensional tolerance, comprises approved material, is labeled correctly, and/or includes the correct finish/coat. In one embodiment, the safety compliance, identification, and security monitoring system is operable to inspect a construction job is within specification. In one embodiment, the safety compliance, identification, and security monitoring system is operable to compare an in-progress job against the approved design plans, wherein the system is operable to determine whether the in-progress job is within specification. In one embodiment, the safety compliance, identification, and security monitoring system is operable to determine whether an in-progress job is in compliance with proper installation practices. In one embodiment, the monitoring device 24 inspects a tool or equipment, wherein the safety compliance, identification, and security monitoring system is operable to utilize a plurality of learning techniques to determine if the tool or equipment is fit to be used. In one embodiment, the safety compliance, identification, and security monitoring system is operable to suggest an additional tool, material, or process to aid the work-in-progress, or provide a report to a supervisor regarding the use of a tool or equipment. Additional information related to image analysis in inspection is disclosed in U.S. Pat. Nos. 11,216,935, 10,733,334, 10,760,991, 10,776,883, and 11,555,701 and US Patent Publication Nos. 2022/0366558, 2024/0210330, and 2023/0011901, each of which is incorporated herein by reference in its entirety. In one embodiment, the safety compliance, identification, and security monitoring system is operable to monitor and/or inspect the facility grounds, wherein the system is operable to identify issues (e.g., pest control, structural integrity, hazardous conditions). In one embodiment, when the system detects an issue or potential issue, the system is operable to issue a warning (e.g., flashing lights or a verbal command). In one embodiment, when the system detects an issue or potential issue, the system is operable to send a notification to the appropriate personnel (e.g., project manager, supervisor). In one embodiment, the notification includes an image of the non-conformance, time and date stamp of the captured image, and location data of the issue or potential issue. In one embodiment, the safety compliance, identification, and security monitoring system is operable to perform utility line/pipe failure inspection. In one embodiment, the safety compliance, identification, and security monitoring system is operable to identify compromised utility line/pipes. In one embodiment, the safety compliance, identification, and security monitoring system is operable to identify potential points of failure with utility line/pipes, including but not limited to obstruction, increased pressure, and sediment build up. In one embodiment, the safety compliance, identification, and security monitoring system is operable to perform a crane inspection. In one embodiment, the safety compliance, identification, and security monitoring system is operable to perform a hoist inspection. In one embodiment, the safety compliance, identification, and security monitoring system is operable to review data from the inspection and generate an inspection report. In one embodiment, the safety compliance, identification, and security monitoring system is operable to generate action items from the inspection, wherein the safety compliance, identification, and security monitoring system is operable to utilize a plurality of learning techniques to provide at least one action item. Additional information related to crane and hoist inspection standards is disclosed in 29 CFR 1910.179 (updated 2016) "Overhead and Gantry Cranes," 29 CFR 1910.184 (updated 2019) "Slings," ANSI B30.2-2022 "Overhead and Gantry Cranes," and ANSI/ASME B30 (updated 2025) "Safety Standard for Cableways, Cranes, Derricks, Hoists, Hooks, Jacks, and Slings," each of which is incorporated herein by reference in its entirety. In one embodiment, the safety compliance, identification, and security monitoring system reviews the calibration records associated with a tool and tracks whether the calibration schedule for the tool is up-to-date. In one embodiment, the safety compliance, identification, and security monitoring system reviews the equipment records (e.g., documentation recording equipment adjustment, calibration, and/or maintenance) and tracks whether the equipment is currently maintained. In one embodiment, the safety compliance, identification, and security monitoring system detects an anomaly (e.g., unusual noises, excess vibrations, fluid leaks, warning lights, and decreased performance) with the equipment, performs a root cause analysis to identify the issue, and recommends maintenance activities. In one embodiment, when the safety compliance, identification, and security monitoring system identifies unvalidated equipment during review of equipment records, the system sends a notification to the appropriate personnel, wherein the notification includes the equipment identification number. In one embodiment, the notification includes an image of the unvalidated equipment and time and date stamp of the captured image. In one embodiment, the safety compliance, identification, and security monitoring system sends a notification to the appropriate personnel for an upcoming calibration or preventative maintenance task due date. In one embodiment, when the safety compliance, identification, and security monitoring system detects a non-conformance, the system is operable to issue a warning (e.g., flashing lights or a verbal command). In one embodiment, the system is operable to send a notification to the appropriate personnel (e.g., project manager, supervisor) when detecting a non-conformance. In one embodiment, the notification includes an image of the non-conformance, time and date stamp of the captured image, and location data of the non-conformance. In one embodiment, the system is operable to determine if a non-conformance occurred using a plurality of learning techniques. Non-conformances include, but are not limited to, untrained personnel entering a controlled/restricted area, untrained personnel using equipment/tools that require specialized training, personnel entering a controlled/restricted area without appropriate PPE, personnel not following procedures, food and/or drinks present on the manufacturing floor, cross-contamination, environmental monitoring results reaching an alert or action limit, personnel performing activities without an approved waiver or planned protocol deviation, losing traceability of product or work-in-progress product, improper storage (e.g., storing flammable materials in the open), improper handling of product or work-in-progress product (e.g., dropping parts, handling sensitive material without gloves), having raw materials in the facility without passing required inspection, use of unvalidated equipment/tools for production, use of uncalibrated inspection equipment/tools, skipping in-process inspection, not conducting line clearance, and final product not meeting specifications. In one embodiment, the system is operable to update the database 42 to flag the non-conforming tool/equipment, wherein after the non-conforming tool/equipment has been flagged, when the system detects use of the flagged non-conforming tool/equipment, the system is operable to issue a warning and/or send a notification to the appropriate personnel. One of ordinary skill in the art will appreciate the present invention is not limited for use on construction and/or job sites and is operable for use in industries tackling safety, security, quality, production, and/or logistical concerns. For example, manufacturing plants and industrial sites typically face issues involving identification and traceability (i.e., appropriately labeling product throughout the production processes such that traceability, the ability to track product from procurement of raw materials to release, is maintained), training compliance, documentation records, change management, production and process controls (e.g., equipment qualification and validation, process validation, process monitoring, environmental control, contamination control), acceptance activities (e.g., in-process inspection, final inspection), and handling and storage.

In one embodiment, the safety compliance, identification, and security monitoring system is operable to perform structural welding inspections. In one embodiment, the safety compliance, identification, and security monitoring system is operable to perform field welding inspections. Field welding occurs when a weld is performed at the location of the final installation, typically due to equipment unable to be removed from their location due to size, time, and resource availability. Field welds are inspected to ensure the safety and structural integrity of the welded structure. Additional information related to weld acceptance criteria is disclosed in API RP 577 Third Edition 2020 "Welding Processes, Inspection, and Metallurgy," which is incorporated herein by reference in its entirety. In one embodiment, the safety compliance, identification, and security monitoring system visually inspects a weld using a plurality of learning techniques and determines if the weld is acceptable. Additional information related to weld inspection using a plurality of learning techniques is disclosed in U.S. Pat. No. 12,251,773, which is incorporated herein by reference in its entirety. In one embodiment, when the safety compliance, identification, and security monitoring system detects a non-conformance, the system is operable to issue a warning (e.g., flashing lights or a verbal command). In one embodiment, the system is operable to send a notification to the appropriate personnel (e.g., project manager, supervisor) when detecting a non-conformance. In one embodiment, the notification includes an image of the non-conformance, time and date stamp of the captured image, and location data of the non-conformance.

In one embodiment, the safety compliance, identification, and security monitoring system is operable to perform deferred maintenance inspection and reviews. Deferred maintenance is the practice of postponing necessary repairs, upkeep, or replacement of assets (e.g., buildings, equipment, or infrastructure) beyond their recommended service life or scheduled maintenance intervals. Consequences include deterioration, reduced functionality, and increased risk of failures or breakdowns over time. Non-limiting examples include unaddressed roof leaks leading to water damage and structural deterioration, outdated HVAC systems requiring frequent repairs to maintain indoor comfort and energy efficiency, cracked or deteriorating pavement and sidewalks increasing safety hazards to pedestrians, plumbing issues such as leaking pipes or clogged drains causing water damage and mold growth, and electrical system malfunctions or outdated wiring increasing the risk of fire hazards. In one embodiment, the safety compliance, identification, and security monitoring system is operable to perform inspections at regular time intervals, wherein the system inspects and identifies potential issues using a plurality of learning techniques. Additional material related to maintenance inspection and/or maintenance prediction using a plurality of learning techniques is disclosed in U.S. Pat. Nos. 11,307,570 and 11,017,321 and US Patent Publication Nos. 2024/0210330, each of which is incorporated herein by reference in its entirety. In one embodiment, the safety compliance, identification, and security monitoring system is operable to update the database 42 to record an asset requires maintenance. In one embodiment, the safety compliance, identification, and security monitoring system is operable to review maintenance tasks and prioritize repairs using risk analysis techniques. In one embodiment, the safety compliance, identification, and security monitoring system is operable to identify deferred maintenance tasks and prioritize tasks using risk analysis techniques. In one embodiment, the safety compliance, identification, and security monitoring system is operable to search the database 42 to identify and flag late maintenance activities, wherein the system is operable to issue a warning and/or send a notification to the appropriate personnel of at least one late maintenance activity. In one embodiment, the safety compliance, identification, and security monitoring system inspects deferred maintenance repairs, wherein the system is operable to use a plurality of learning techniques. In one embodiment, the system determines whether the repair is acceptable, wherein the system analyzes images of the repair to determine if the repair meets established acceptance criteria. In one embodiment, when the safety compliance, identification, and security monitoring system detects a non-conformance, the system is operable to issue a warning (e.g., flashing lights or a verbal command). In one embodiment, the system is operable to send a notification to the appropriate personnel (e.g., project manager, supervisor) when detecting a non-conformance. In one embodiment, the notification includes an image of the non-conformance, time and date stamp of the captured image, and location data of the non-conformance.

In one embodiment, the safety compliance, identification, and security monitoring system is operable to perform bridge inspections. Additional information related to bridge inspection standards is disclosed in 23 CFR Part 650 Subpart C, "National Bridge Inspection Standards (NBIS)," updated 2022, which is incorporated herein by reference in its entirety. In one embodiment, the safety compliance, identification, and security monitoring system is operable to inspect a bridge at regular time intervals. In one embodiment, the safety compliance, identification, and security monitoring system is operable to inspect a bridge within a given timeline. In one embodiment, the safety compliance, identification, and security monitoring system utilizes a plurality of learning techniques to inspect a bridge. Additional information related to the plurality of learning techniques for infrastructure inspection is disclosed in U.S. Pat. Nos. 11,551,344, and 11,361,423, each of which is incorporated herein by reference in its entirety. In one embodiment, when the safety compliance, identification, and security monitoring system detects a non-conformance, the system is operable to issue a warning (e.g., flashing lights or a verbal command). In one embodiment, the system is operable to send a notification to the appropriate personnel (e.g., project manager, supervisor) when detecting a non-conformance. In one embodiment, the notification includes an image of the non-conformance, time and date stamp of the captured image, and location data of the non-conformance.

In one embodiment, the safety compliance, identification, and security monitoring system is operable to perform structural inspections. A structural inspection is an examination of the building, assessing the structural condition and integrity of the building. As a non-limiting example, a structural inspection includes inspection of the foundation, framing, support systems, roof, windows, and doors. Additional information to relevant codes, standards, and best practices is disclosed in AISC 360 "Specification for Structural Steel Buildings," updated 2022; AISC 325 "Manual of Steel Construction," updated 2023; ACI 318 "Building Code Requirements for Structural Concrete," updated 2019; AWC NDS "National Design Specification for Wood Construction," updated 2024; ASCE 7 "Minimum Design Loads and Associated Criteria for Building and Other Structures," updated 2022; AWS D1.1/D1.1M "Structural Welding Code-Steel," updated 2020; AISC 341 "Seismic Provisions for Structural Steel Buildings," updated 2022; ACI 350 "Code Requirements for Environmental Engineering Concrete Structures," updated 2020; and ACI 376 "Concrete Structures for Containment of Refrigerated Liquefied Gases," updated 2023, each of which is incorporated herein by reference in its entirety. In one embodiment, the safety compliance, identification, and security monitoring system is operable to inspect an area of interest at regular time intervals. In one embodiment, the safety compliance, identification, and security monitoring system is operable to inspect an area of interest within a given timeline. In one embodiment, the safety compliance, identification, and security monitoring system inspects an area of interest for structural condition and structural integrity, wherein the system is operable to utilize a plurality of learning techniques. Additional information related to the plurality of learning techniques for infrastructure inspection is disclosed in U.S. Pat. Nos. 11,551,344, and 11,361,423, each of which is incorporated herein by reference in its entirety. In one embodiment, when the safety compliance, identification, and security monitoring system detects a non-conformance, the system is operable to issue a warning (e.g., flashing lights or a verbal command). In one embodiment, the system is operable to send a notification to the appropriate personnel (e.g., project manager, supervisor) when detecting a non-conformance. In one embodiment, the notification includes an image of the non-conformance, time and date stamp of the captured image, and location data of the non-conformance.

In one embodiment, the safety compliance, identification, and security monitoring system is operable to inspect a building envelope. In one embodiment, the safety compliance, identification, and security monitoring system is operable to perform exterior envelope water intrusion and elements/detail inspections. Water intrusion testing (i.e., water penetration testing) is a set of standardized field tests that evaluate the performance of building installations, such as windows, doors, skylights, exterior facades, and curtain walls, for water penetration resistance. Additional information related to standard test methods is disclosed in ASTM E 1105 "Standard Test Method for Field Determination of Water Penetration of Installed Exterior Windows, Skylights, Doors, and Curtain Walls, by Uniform or Cyclic Static Air Pressure Difference," updated 2023, which is incorporated herein by reference in its entirety. In one embodiment, the safety compliance, identification, and security monitoring system is operable to inspect an area of interest at regular time intervals, wherein the area of interest includes the building envelope. In one embodiment, the safety compliance, identification, and security monitoring system is operable to inspect an area of interest within a given timeline, wherein the area of interest includes the building envelope. In one embodiment, the safety compliance, identification, and security monitoring system inspects an area of interest for water intrusion and/or detail inspection, wherein the system is operable to utilize a plurality of learning techniques. In one embodiment, the safety compliance, identification, and security monitoring system is operable to identify potential issues (e.g., deformation, detachment, displacement, delamination, warping, cracking, discoloration, peeling, etc.) of the building envelope, wherein the system is operable to utilize a plurality of learning techniques. In one embodiment, the safety compliance, identification, and security monitoring system includes a plurality of moisture sensors, wherein the system is operable to detect water and/or leaks. In one embodiment, the safety compliance, identification, and security monitoring system analyzes the area of interest for water and/or leaks, wherein the system is operable to use a plurality of learning techniques on captured images and/or data from at least one moisture sensor. Additional information related inspection with a plurality of learning techniques is disclosed in US Patent Publication No. 2024/0210330, which is incorporated herein by reference in its entirety. In one embodiment, when the safety compliance, identification, and security monitoring system detects a non-conformance, the system is operable to issue a warning (e.g., flashing lights or a verbal command). In one embodiment, the system is operable to send a notification to the appropriate personnel (e.g., project manager, supervisor) when detecting a non-conformance. In one embodiment, the notification includes an image of the non-conformance, time and date stamp of the captured image, and location data of the non-conformance.

In one embodiment, the safety compliance, identification, and security monitoring system is operable to perform infrastructure inspections. In one embodiment, the safety compliance, identification, and security monitoring system is operable to recommend maintenance activities. In one embodiment, the safety compliance, identification, and security monitoring system is operable to inspect infrastructure at regular time intervals. In one embodiment, the safety compliance, identification, and security monitoring system is operable to inspect infrastructure within a given timeline. In one embodiment, the safety compliance, identification, and security monitoring system utilizes a plurality of learning techniques to inspect infrastructure. Additional information related to the plurality of learning techniques for infrastructure inspection is disclosed in U.S. Pat. Nos. 11,551,344, and 11,361,423, each of which is incorporated herein by reference in its entirety. In one embodiment, the safety compliance, identification, and security monitoring system is operable to perform inspections at regular time intervals, wherein the system inspects and identifies potential issues using a plurality of learning techniques. Additional material related to maintenance inspection and/or maintenance prediction using a plurality of learning techniques is disclosed in U.S. Pat. Nos. 11,307,570 and 11,017,321 and US Patent Publication No. 2024/0210330, each of which is incorporated herein by reference in its entirety. In one embodiment, the safety compliance, identification, and security monitoring system is operable to update the database 42 to record recommended maintenance tasks. In one embodiment, the safety compliance, identification, and security monitoring system is operable to review maintenance tasks and prioritize repairs using risk analysis techniques. In one embodiment, the safety compliance, identification, and security monitoring system inspects maintenance repairs, wherein the system is operable to use a plurality of learning techniques. In one embodiment, the system determines whether the repair is acceptable, wherein the system analyzes images of the repair to determine if the repair meets established acceptance criteria. In one embodiment, when the safety compliance, identification, and security monitoring system detects a non-conformance, the system is operable to issue a warning (e.g., flashing lights or a verbal command). In one embodiment, the system is operable to send a notification to the appropriate personnel (e.g., project manager, supervisor) when detecting a non-conformance. In one embodiment, the notification includes an image of the non-conformance, time and date stamp of the captured image, and location data of the non-conformance.

In one embodiment, the safety compliance, identification, and security monitoring system is operable to perform agricultural field review and inspection. In one embodiment, the safety compliance, identification, and security monitoring system is operable to inspect and assess an agricultural field. Non-limiting examples include assessing for crop health, growth progress, pest infestation, and environmental conditions. In one embodiment, the safety compliance, identification, and security monitoring system is operable to inspect an agricultural field at regular time intervals. In one embodiment, the safety compliance, identification, and security monitoring system is operable to inspect an agricultural field within a given timeline. In one embodiment, the safety compliance, identification, and security monitoring system is operable to use a plurality of learning techniques to analyze the agricultural field. Additional material related to agriculture review using a plurality of learning techniques is disclosed in U.S. Pat. Nos. 11,521,381, 12,141,730, and 12,183,024 and US Patent Publication Nos. 2024/0061440, each of which is incorporated herein by reference in its entirety. In one embodiment, the safety compliance, identification, and security monitoring system is operable to use predictive analytics. In one embodiment, the safety compliance, identification, and security system is operable to document pesticide application practices, wherein the system captures images of the treated field and records location, time, and date information. In one embodiment, the safety compliance, identification, and security monitoring system is operable to capture and record sediment and erosion control practices, wherein the system captures images of the activities and records location, time, and date information. In one embodiment, when the safety compliance, identification, and security monitoring system detects a potential issue, the system is operable to issue a warning and/or send a notification to the appropriate personnel. In one embodiment, when the safety compliance, identification, and security monitoring system makes a prediction (e.g., target date for crop harvest, crop yield mapping), the system is operable to send the prediction to the appropriate personnel. In one embodiment, when the safety compliance, identification, and security monitoring system detects a non-conformance, the system is operable to issue a warning (e.g., flashing lights or a verbal command). In one embodiment, the system is operable to send a notification to the appropriate personnel when detecting a non-conformance. In one embodiment, the notification includes an image of the non-conformance, time and date stamp of the captured image, and location data of the non-conformance.

In one embodiment, the safety compliance, identification, and security monitoring system is operable to assist in power/communication line installation and repair activities. In one embodiment, the safety compliance, identification, and security monitoring system is operable to inspect infrastructure at regular time intervals. In one embodiment, the safety compliance, identification, and security monitoring system is operable to inspect infrastructure within a given timeline. In one embodiment, the safety compliance, identification, and security monitoring system is operable to inspect power lines and/or power pylons and detect potential issues (e.g., bird's nests, lightning strike damage, encroaching vegetation, rust/corrosion, damaged bolts). In one embodiment, the safety compliance, identification, and security monitoring system is operable to inspect communication lines and/or communication towers and detect potential issues (e.g., corrosion, scratches, debris, damage to cable insulation). In one embodiment, the system is operable to analyze and calculate the distance of vegetation from power/communication lines, wherein the system determines if the vegetation clearance from a power/communication line within an acceptable range. In one embodiment, the system is operable to monitor, analyze, and/or predict natural phenomena (e.g., severe weather, natural disaster, solar flare, wildlife) operable to impact the power/communication line infrastructure. In one embodiment, the system is operable to receive information about natural phenomena operable to impact the power/communication line infrastructure via the Internet. In one embodiment, the system monitors power lines and is operable to detect fire hazards. In one embodiment, the system detects fires in power line corridors. In one embodiment, the system detects fires when monitoring power lines. In one embodiment, the safety compliance, identification, and security monitoring system is operable to use predictive analytics. In one embodiment, the system predicts high-risk fire areas. In one embodiment, the system detects downed lines. In one embodiment, the system inspects and/or monitors power/communication line infrastructure for damaged, aged, or weakened components. In one embodiment, the safety compliance, identification, and security monitoring system includes sensors to inspect underground lines, including but not limited to ultrasonic sensors, electromagnetic sensors, and fault detection sensors. In one embodiment, the safety compliance, identification, and security monitoring system is operable to inspect infrastructure during installation. In one embodiment, the safety compliance, identification, and security monitoring system is operable to inspect infrastructure after installation. In one embodiment, the safety compliance, identification, and security monitoring system is operable to inspect infrastructure during repair activities. In one embodiment, the safety compliance identification, and security monitoring system is operable to inspect infrastructure after repair activities. In one embodiment, the system determines if additional repair activities are required. In one embodiment, the system determines if additional maintenance activities are required. In one embodiment, the safety compliance, identification, and security monitoring system is operable to use a plurality of learning techniques to analyze inspected infrastructure. Additional material related to power/communication line inspection using a plurality of learning techniques is disclosed in U.S. Pat. No. 11,475,385, which is incorporated herein by reference in its entirety. In one embodiment, when the safety compliance, identification, and security monitoring system detects a potential issue, the system is operable to issue a warning and/or send a notification to the appropriate personnel. In one embodiment, when the safety compliance, identification, and security monitoring system detects a non-conformance, the system is operable to issue a warning (e.g., flashing lights or a verbal command). In one embodiment, the system is operable to send a notification to the appropriate personnel when detecting a non-conformance. In one embodiment, the notification includes an image of the non-conformance, time and date stamp of the captured image, and location data of the non-conformance.

In one embodiment, the monitoring device 24 is operable to have a plurality of operation modes, including an active mode wherein all of the systems and/or sensors are actively operating and an inactive mode where at least one system or at least one sensor is in a "sleep" mode. In one embodiment, one of the plurality of operational modes is an alert mode, wherein the monitoring device 24 is operable to automatically switch from a sleep mode to an active mode by an event detection. As a non-limiting example, motion detected at night triggers the image capturing device and at least one light to be activated. In one embodiment, the monitoring device 24 includes at least one button. In one embodiment, the at least one button is operable to be a power button, a volume button, and/or a button to toggle between operation modes. In one embodiment, at least one of the plurality of operation modes includes a custom mode, wherein an authorized user is operable to program a workflow, wherein a workflow designates actions after specific inputs are met. Non-limiting examples include designating personnel (e.g., project manager, supervisor) to send notifications and/or warnings, making an announcement through a speaker when a hazard 44 is identified, and setting a surveillance rotation route for the monitoring device 24. In one embodiment, the mode of operation is operable to be pre-set, updated manually by pressing the at least one button, or updated via a mobile computing device. In one embodiment, the mode of operation is operable to be set for a specific time, wherein the monitoring device 24 is operable to determine the time by an internal clock, a timing mechanism, and/or communication using the Network Time Protocol (NTP). In one embodiment, the monitoring device 24 uses a light sensor to distinguish between day and night.

In one embodiment, when the safety compliance, identification, and security monitoring system detects motion during off-shift hours (e.g., night), the system activates the image capturing device and at least one light. In one embodiment, the safety compliance, identification, and security monitoring system further issues a warning, including, but not limited to, a verbal warning emanating from an on-board speaker, notifying that the job site is closed and off-limits. In one embodiment, the system issues an alert to appropriate personnel (e.g., project manager, supervisor, and/or first responders). In one embodiment, the system activates a scanner to detect if a unique ID tag 32 is present. If a unique ID tag 32 is detected within the area of movement, the system is operable to not contact first responders.

In one embodiment, the safety compliance, identification, and security monitoring system generates a report for safety compliance, security, insurance, and/or quality assurance documentation. In one embodiment, the report is operable to include a schedule of contractors in terms of their presence on the job site, the number of PPE violations, occurrences of injuries, environmental conditions (e.g., temperature, rain, humidity), and/or natural events (e.g., fires, earthquakes). In one embodiment, the safety compliance, identification, and security monitoring system is operable to store data in a physical database or within the cloud. In one embodiment, the safety compliance, identification, and security monitoring system is operable to be accessible by mobile device so that those with administrative privileges are operable to access the system in real time to view video feeds and data collected by the plurality of sensors.

Figure 3:
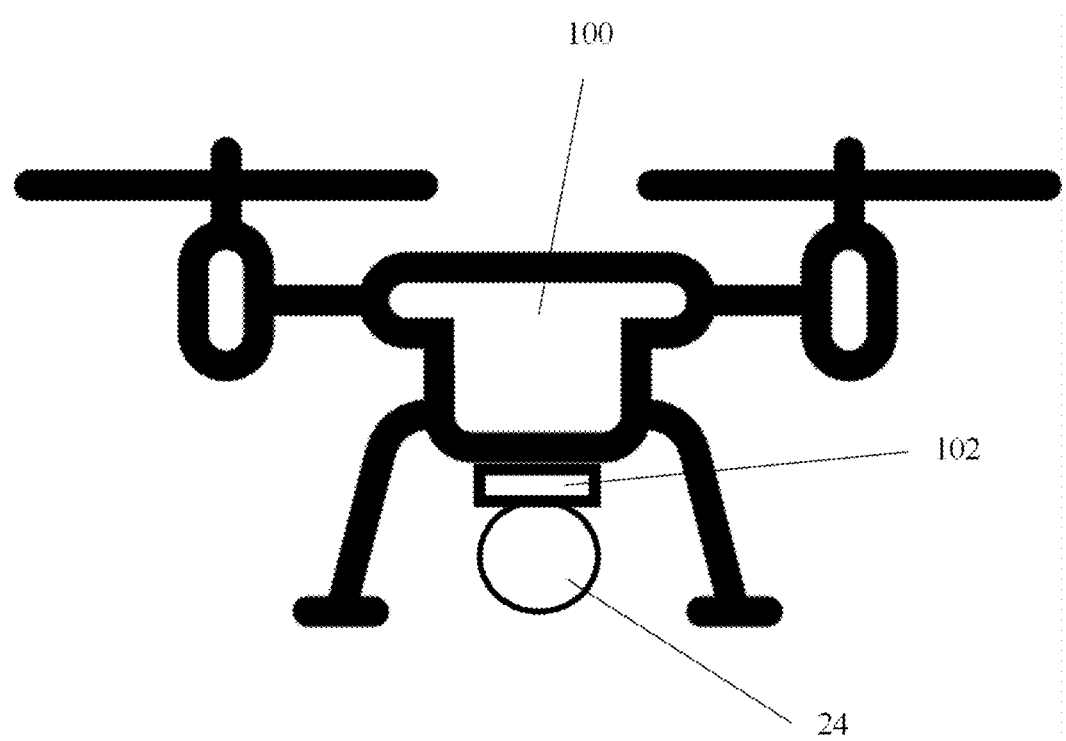
FIG. 3 illustrates an orthogonal front view of the monitoring device attached to an unmanned aerial vehicle according to one embodiment of the present invention.

FIG. 3 illustrates an orthogonal front view of the monitoring device 24 attached to an unmanned aerial vehicle according to one embodiment of the present invention.

In a preferred embodiment, the safety compliance, identification, and security monitoring system further includes an unmanned aerial vehicle (UAV). Advantageously, the UAV 100 is operable be deployed to reach and capture images from angles and/or heights previously unable to be reached or otherwise impractical. Further, a UAV 100 is mobile and operable to move around a job site. In a preferred embodiment, the UAV 100 is configured to receive the monitoring device 24. In one embodiment, the UAV 100 is in network communication with the monitoring device 24. In one embodiment, the UAV 100 is in network communication with the plurality of monitoring devices. In one embodiment, a plurality of UAVs is in network communication with the plurality of monitoring devices. In one embodiment, the monitoring device 24 further includes a gimbal (stabilizer). In one embodiment, the UAV 100 is configured to receive an image capturing device, at least one speaker, and at least one of the plurality of sensors. In one embodiment, the UAV 100 is configured to receive the casing of the monitoring device 24 via an adapter 102.

In one embodiment, the UAV 100 is a tethered drone, wherein the safety compliance, identification, and security monitoring system includes an UAV 100. Tethers transmitting power supplied from a ground base, aerial, or mobile power supply provides advantages such as extended flight times and uninterrupted, continuous power. Further, tethers are operable to transmit data to and from the drone, providing for real-time data transmission.

Figure 4:
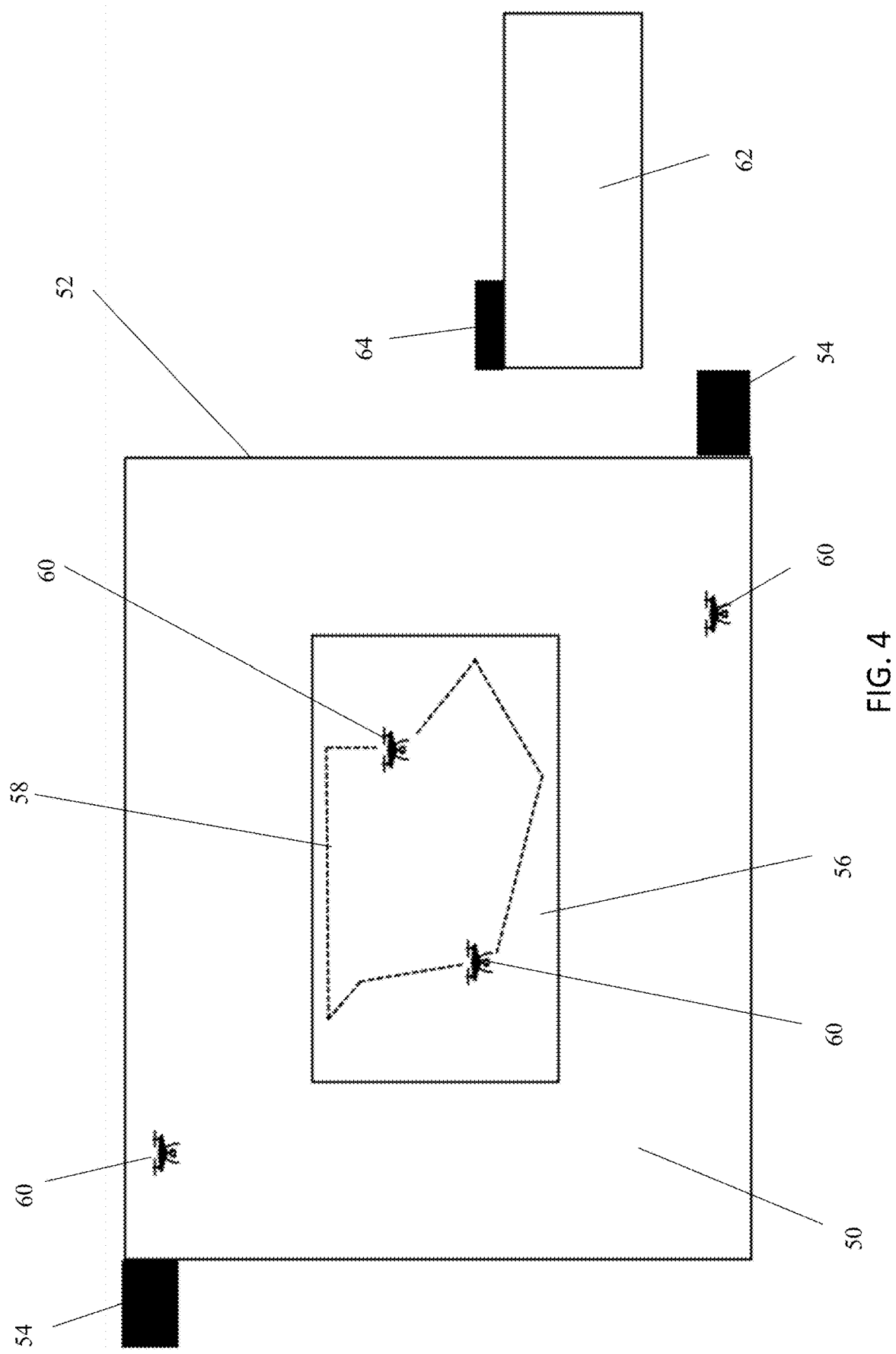
FIG. 4 is a schematic of an embodiment of the present invention at a job site.

FIG. 4 is a schematic diagram of an embodiment of the present invention at a job site. In one embodiment, the safety compliance, identification, and security monitoring system includes a plurality of unmanned aerial vehicles (UAVs) and a plurality of monitoring devices, wherein each of the plurality of UAVs is configured to receive one of the plurality of monitoring devices, forming a mobile monitoring device 60. In one embodiment, a mobile monitoring device 60 is positioned to facilitate detection of movement in and out of an entry point 54. In one embodiment, the mobile monitoring device 60 is located within a geographic area 50 on the job site. In one embodiment, the mobile monitoring device 60 is located on the fence 52. In one embodiment, the fence 52 is not a physical fence, wherein the fence 52 defines the boundaries of the job site. In one embodiment, the fence 52 is a geolocation fence. In one embodiment, at least one of the plurality of monitoring devices is stationed near an entry point 54, wherein the at least one monitoring device is configured to monitor the area around the entry point 54, wherein the at least one monitoring device is positioned to facilitate detection of movement at the entry point 54. One of ordinary skill in the art will appreciate the mobile monitoring device 60 stationed at one location is operable to function without the UAV as the device does not require mobility to fulfill its function.

In one embodiment, at least one mobile monitoring device 60 is located within a region of interest 56. Non-limiting examples of regions of interest 56 include a controlled area, outside a clean room, storage areas, the building under construction, and an area with expensive equipment. In one embodiment, at least one mobile monitoring device 60 is located to facilitate monitoring a region of interest 56. In one embodiment, the at least one mobile monitoring device 60 patrols the region of interest 56 in a route 58. In one embodiment, the route 58 is scheduled, wherein the route is set by appropriate personnel. In one embodiment, the route 58 includes at least one alternate route, wherein the mobile monitoring device 60 switches to the at least one alternate route after a triggering event, including but not limited to detecting a loud sound, detecting suspicious activity, detecting a potential hazard, a time in the day, receiving an anomalous reading from a sensor, and receiving a request to switch to the alternate route from a qualified worker. In one embodiment, the at least one mobile monitoring device 60 is operable to travel freely (e.g., without a planned route) in the region of interest 56 when the at least one mobile monitoring device 60 detects an event. Non-limiting examples of an event include malfunctioning equipment, untrained personnel entering the region of interest 56, improper tool and/or equipment use, improper storage, identification or traceability issue, identification of non-conforming product, use of unvalidated equipment, use of uncalibrated inspection tools and/or equipment, and any other non-conformances. In one embodiment, the at least one mobile monitoring device 60 is operable to navigate the region of interest 56 without following a predetermined path. In one embodiment, the at least one mobile monitoring device 60 is operable to detect and avoid obstacles when moving in the region of interest 56. In one embodiment, the at least one mobile monitoring device monitors the region of interest 56 by moving between set points in the region of interest 56. Set points include, but are not limited to, positions near specific equipment, expensive and/or fragile items, and strategic locations in the region of interest 56 (e.g., corners, middle of the room, and entry points). In one embodiment, the at least one mobile monitoring device 60 moves between the set points at regular time intervals. In one embodiment, the at least one mobile monitoring device 60 moves between the set points when issued a command from a qualified worker. In one embodiment, the at least one mobile monitoring device 60 travels counter-clockwise through the sets points. In one embodiment, the at least one mobile monitoring device 60 travels clockwise through the set points. In one embodiment, the at least one monitoring device 60 travels randomly through the set points. In one embodiment, the at least one mobile monitoring device 60 travels in a pattern through the set points, wherein the at least one mobile monitoring device 60 visits each set point throughout the day. In one embodiment, all set points in a region of interest 56 are visited by at least one of the plurality of mobile monitoring devices 60 in a time frame (e.g., work shift, work day, day, and night).

In one embodiment, the job site includes a data command center and/or project management station 62. In one embodiment, the data command center and/or project management station 62 is a mobile office trailer. In one embodiment, the data command center and/or project management station 62 is a temporary structure. In one embodiment, the data command center and/or project management station 62 includes a mobile monitoring device 60 storage area 64. In one embodiment, at least one mobile monitoring device 60 receives updates when in the storage area 64. In one embodiment, at least one mobile monitoring device 60 charges when in the storage area 64. In one embodiment, at least one mobile monitoring device 60 offboards data when in the storage area 64. In one embodiment, data from at least one monitoring device 60 is wireless transmitted to a computer system in the data command center and/or project management station 62, wherein the data is analyzed.

Figure 5:
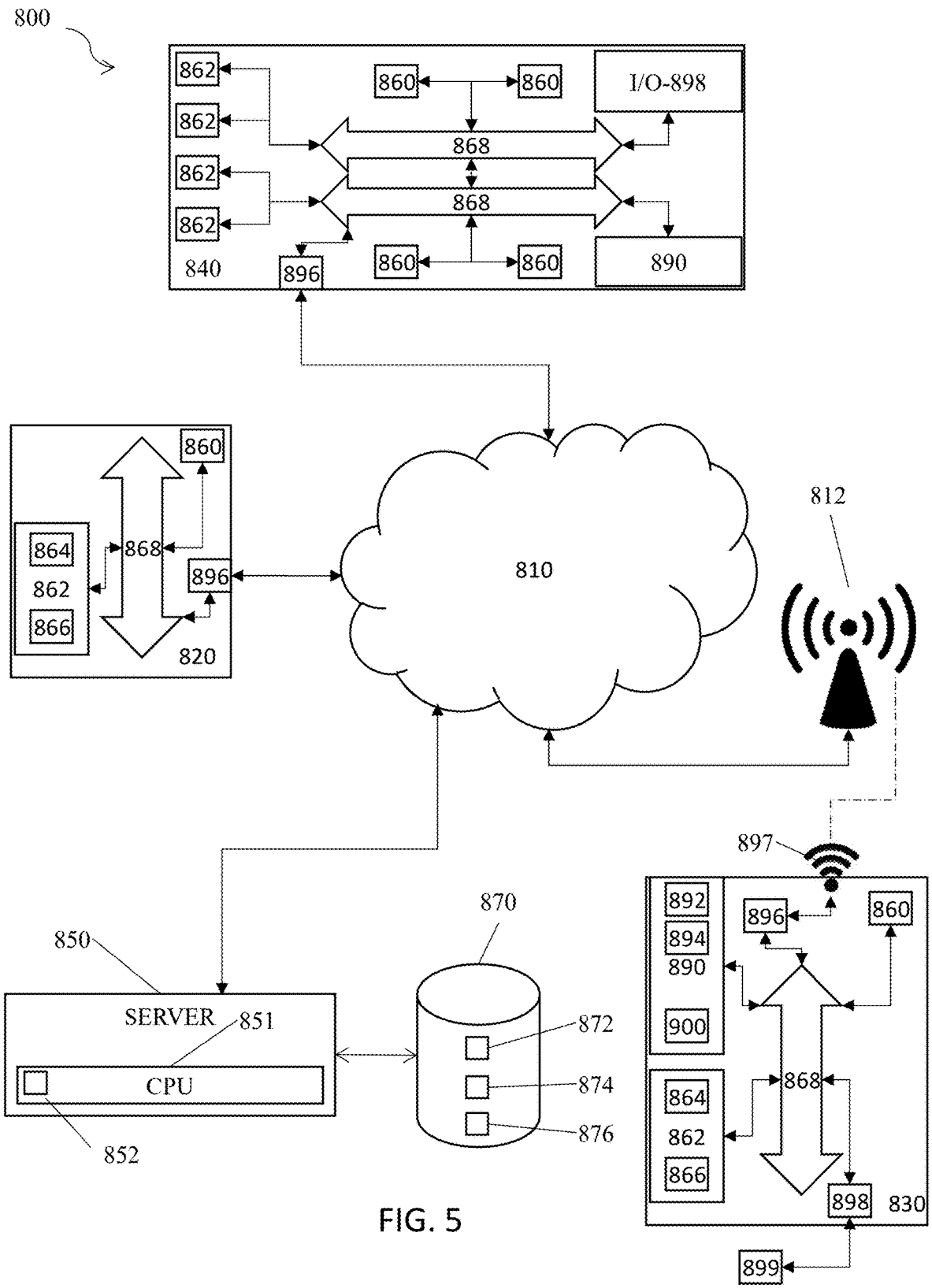
FIG. 5 is a schematic diagram of an embodiment of the invention illustrating a computer system.

FIG. 5 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 5, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 5, is operable to include other components that are not explicitly shown in FIG. 5, or is operable to utilize an architecture completely different than that shown in FIG. 5. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

In one embodiment, the system includes a headset configured for virtual reality, augmented reality, and/or mixed reality environments ("AR/VR"). The headset preferably includes a display, an eyewear component, at least one power supply component, at least one image capturing device, and/or control electronics. In one embodiment, the headset is a pair of goggles. Alternatively, the headset is a pair of glasses. In one embodiment, the headset includes at least one strap and/or temples. In one embodiment, the power supply component includes at least one battery, at least one supercapacitor, or other similar power supply components. In another embodiment, the battery includes at least one rechargeable battery. In yet another embodiment, the at least one rechargeable battery includes a lithium ion battery.

The headset is configured to receive and display an image of a virtual scene, movie, and/or environment. The headset is further operable to receive audio data and communicate the audio data to a wearer via a speaker, headphones, and other similar audio playback devices. In one embodiment, the headphones are noise-cancelling headphones. The noise-cancelling headphones are configured to block out external noise such that the wearer is completely immersed in the AR/VR environment.

Examples of headsets and/or AR/VR systems include, but are not limited to, those described in U.S. Pat. Nos. 8,217, 856; 8,743,145; 9,094,677; 9,223,136; 9,635,450; 9,671, 614; 9,733,480; 9,734,402; 9,766,462; 9,846,483; 9,858, 703; 9,897,812; 9,989,998; 10,025,060; 10,037,084; 10,055, 645; 10,055,887; 10,061,352; 10,061,391; 10,082,672; 10,102,674; 10,122,990; 10,124,251; 10,133,305; 10,185, 390; 10,209,769; 10,244,226; 10,254,547; 10,261,579; 10,318,007; 10,395,111; 10,419,731; 10,429,647; 10,452, 911; 10,540,003; 10,656,423; 10,656,822; 10,701,342; 10,769,438; 10,825,255; 10,838,206; 10,843,067; 10,890, 941; 10,911,734; 10,922,886; 10,928,613; 10,951,880; 10,979,681; 11,030,719; 11,055,879; 11,106,276; 11,145, 031; 11,145,096; 11,159,713; 11,170,678; 11,217,021; 11,228,745; 11,275,945; 11,281,290; and 11,288,027 and U.S. Patent Publication Nos. 20200049946, 20210243384, and 20220130103, each of which is incorporated herein by reference in its entirety.

In one embodiment, the at least one strap is configured to wrap around a wearer's head and attach to the eyewear component via at least one attachment mechanism. The at least one attachment mechanism includes a hook and loop fastener, a latch, a button, a buckle, a snap, a tie, a clip, and other similar attachment mechanisms. The at least one strap is adjustable to a wearer's head. Advantageously, this allows the headset to be used for wearers of different head sizes. For example, and not limitation, the at least one strap includes a tightening mechanism. In one embodiment, the tightening mechanism is configured to rotate in one direction and increase the tension in the head strap and rotate in the opposite direction to loosen the tension in the head strap. In yet another embodiment, the at least one strap includes at least two straps. In one embodiment, the at least two straps do not overlap and are in a parallel position around a wearer's head. Alternatively, the at least two straps are configured to intersect in the center of the back of a wearer's head to provide a tighter fit.

Advantageously, the headset is configured to provide minimal pressure to a wearer's face. In one embodiment, the headset includes a nose component. In one embodiment, a wearer's nose is operable to rest inside the nose component. In one embodiment, the nose component is adjustable. In one embodiment, the nose component is configured to move left, right, up, and/or down. In one embodiment, the nose component is operable to expand. Alternatively, the headset is designed to rest on the ridge of the wearer's nose. In yet another embodiment, the headset covers a wearer's entire face.

In one embodiment, the at least one image capturing device is a motion sensor camera. In one embodiment, the motion sensor camera is configured to capture a wearer's body movement. Additionally or alternatively, the at least one image capturing device includes a LIDAR camera. The at least one image capturing device is further operable to determine a wearer's positioning and provide at least one recommendation to correct a wearer's positioning based on the display.

The control electronics preferably include at least one processor. By way of example, and not limitation, the processor includes a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that is operable to perform calculations, process instructions for execution, and/or other manipulations of information. In one embodiment, one or more of the at least one processor is operable to run predefined programs stored in at least one memory of the control electronics.

The control electronics preferably includes at least one antenna, which allows the control electronics to receive and process input data (e.g., AR/VR settings) from at least one remote device (e.g., smartphone, tablet, laptop computer, desktop computer). In a preferred embodiment, the at least one remote device is in wireless network communication with the control electronics. The wireless communication is, by way of example and not limitation, radiofrequency, BLUETOOTH®, ZIGBEE®, WI-FI®, wireless local area networking, near field communication (NFC), or other similar commercially utilized standards. Alternatively, the at least one remote device is in wired communication with the control electronics through USB or equivalent.

In one embodiment, the at least one processor is a microcontroller. The microcontroller includes a transceiver, BLUETOOTH module, WI-FI module, a microprocessor, an ultra-low-power co-processor, read-only memory (ROM), random-access memory (RAM) (e.g., static random-access memory (SRAM)), flash memory, a power management unit, and/or a digital-to-analog converter.

In a preferred embodiment, the headset includes at least one sensor. The at least one sensor includes, but is not limited to, at least one gyroscope, at least one accelerometer, at least one magnetometer, and/or at least one eye tracker. The at least one sensor is preferably connected to the at least one processor. The at least one processor is operable to track and plot movement (e.g., user's head, user's eyes), for example, and not limitation, in an XYZ plane that is different than the at least one image capturing device. In one embodiment, the headset is operable to provide foveated rendering. Alternatively, the headset is operable to provide fixed foveated rendering.

In yet another embodiment, the AR/VR system is operable to receive wearer voice input data. The AR/VR system includes a microphone that is operable to receive and record a wearer's voice. The headset is further operable to change the display based on the wearer's words. For example, and not limitation, the AR/VR system is configured to receive the words "Turn on lights from a wearer, and activate at least one of the plurality of lights. The headset is operable to communicate, preferably wirelessly, with at least one remote device including, but not limited to, a mobile phone or a tablet. The mobile phone is operable to be any mobile phone that (1) is capable of running mobile applications and (2) is capable of communicating with the headset. The mobile phone includes, for example, an ANDROID™ phone, an APPLE® IPHONE®, or a SAMSUNG® GALAXY® phone. Likewise, the tablet is operable to be any tablet that (1) is capable of running mobile applications and (2) is capable of communicating with the headset. The tablet includes, for example, the 3G or 4G version of the APPLE® IPAD® or the 5G version of the Samsung Galaxy Tab S6.

Further in the AR/VR system, the remote device is in communication with a cellular network and/or a network. The network is operable to be any network for providing wired or wireless connection to the Internet, such as a local area network (LAN) or a wide area network (WAN).

In one embodiment, an AR/VR mobile application is installed and running at the remote device. The AR/VR system mobile application is implemented according to the type (i.e., the operating system) of remote device on which it is running. The AR/VR system mobile application is designed to receive wearer information from the headset. In one embodiment, the AR/VR mobile application is operable to provide graphical, audible, and/or tactile feedback to the wearer. In one embodiment, the AR/VR system is configured to develop a personalized profile based on a wearer's prior AR/VR environments and response.

The AR/VR system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The AR/VR system is operable to use any of the aforementioned learning techniques alone or in combination.

Further, the AR/VR system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The AR/VR system is preferably operable to recommend and/or perform actions based on historical data, external data sources, ML, AI, NNs, and/or other learning techniques. The AR/VR system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Further, the safety compliance, identification, and security monitoring system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The safety compliance, identification, and security monitoring system is preferably operable to recommend and/or perform actions based on historical data, external data sources, ML, AI, NNs, and/or other learning techniques. The safety compliance, identification, and security monitoring system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. Although the term "job site" is used in the present application, one of ordinary skill in the art understands that this term refers to any work premises, including but not limited to offices, factories, oil rigs, power plants, mines, construction sites, and retail stores. All modifications and improvements have been deleted herein for the sake of conciseness and readability but are properly within the scope of the present invention.

The invention claimed is:

1. A safety compliance, identification, and security monitoring system, comprising:
at least one monitoring device including an image capturing device and a casing;
an unmanned aerial vehicle (UAV);
a physical unique identifier tag;
a database; and
a computer system;
wherein the casing covers the image capturing device;
wherein the casing is attached to the UAV;
wherein the casing is electrochromic;
wherein applying a voltage changes an opacity of the casing;
wherein the UAV is in network communication with the at least one monitoring device;
wherein the database is operable to store identification information, wherein the identification information includes identities of people who are authorized to access a predefined area, required safety equipment information for the predefined area, a unique identifier code associated with the physical unique identifier tag;
wherein the at least one monitoring device is operable to detect the physical unique identifier tag on an object associated with a person in the predefined area;
wherein the at least one monitoring device transmits data for the physical unique identifier tag to the computer system;
wherein the computer system searches the database for the identification information associated with the physical unique identifier tag;
wherein the image capturing device records an image of the person and transmits the image to the computer system;
wherein the computer system analyzes the image and identifies safety equipment used by the person, wherein the computer system compares the identified safety equipment to the required safety equipment information to determine whether a required safety equipment condition is fulfilled;
wherein the computer system is operable to generate a report, including the image and a date and a time of image capture;
wherein when the computer system determines the person is missing a required safety equipment, the computer system provides a notification; and
wherein the at least one monitoring device travels in a scheduled path around the predefined area.

2. The system of claim 1, wherein the physical unique identifier tag is a physical identification card, a scannable sticker, a scannable label, a location chip, or a magnetic card.

3. The system of claim 1, wherein the casing comprises a high-impact material.

4. The system of claim 1, wherein the at least one monitoring device further includes a speaker.

5. The system of claim 4, wherein the notification is an auditory format and announced with the speaker.

6. The system of claim 1, wherein the at least one monitoring device further includes at least one light, wherein the at least one light is operable to provide directional lighting.

7. A safety compliance, identification, and security monitoring system, comprising:
- at least one monitoring device including an image capturing device, at least one sensor, and a casing;
- an unmanned aerial vehicle (UAV);
- a physical unique identifier tag;
- a database; and
- a computer system;
- wherein the casing is electrochromic;
- wherein applying a voltage changes an opacity of the casing;
- wherein the UAV is configured to receive the monitoring device;
- wherein the database is operable to store identification information, wherein the identification information includes identities of people who are authorized to access a predefined area, required safety equipment information for the predefined area, a unique identifier code associated with the physical unique identifier tag;
- wherein the at least one monitoring device is operable to detect the physical unique identifier tag on an object associated with a person in the predefined area;
- wherein when the at least one monitoring device detects the physical unique identifier tag, the image capturing device captures an image of the person;
- wherein the computer system receives the data of the physical unique identifier tag and the image of the person;
- wherein computer system accesses from the database the identification information associated with the physical unique identifier tag;
- wherein the computer system analyzes the image and identifies safety equipment used by the person, wherein the computer system compares the identified safety equipment to the required safety equipment information to determine whether a required safety equipment condition is fulfilled;
- wherein the computer system is operable to generate a report, including the image and a date and a time of image capture;
- wherein when the computer system determines the person is missing a required safety equipment, the computer system provides a notification; and
- wherein the at least one monitoring device travels in a scheduled path around the predefined area.

8. The system of claim 7, wherein the physical unique identifier tag is a physical identification card, a scannable sticker, a scannable label, a location chip, or a magnetic card.

9. The system of claim 7, wherein the at least one monitoring device further includes a plurality of lights, wherein the plurality of lights are distributed substantially evenly around the casing, and wherein the plurality of lights are attached to the casing on an exterior of the casing.

10. The system of claim 9, wherein one of the plurality of lights is operable to blink, flash, pulse, or illuminate in a pattern.

11. The system of claim 7, wherein the at least one sensor includes a scanner, a motion sensor, an acceleration sensor, an electromagnetic sensor, a location sensor, a sound sensor, a temperature sensor, a humidity sensor, an object sensor, an air pressure sensor, a precipitation sensor, an anemometer, a light sensor, an air quality sensor, a chemical sensor, an ammeter, a voltmeter, a power meter, a magnetic field sensor, an orientation sensor, and/or a smoke detector.

12. The system of claim 7, wherein the at least one monitoring device includes a plurality of operation modes, wherein the at least one monitoring device is operable to automatically switch from a sleep mode to an active mode when an event is detected.

13. The system of claim 7, wherein the notification is a visual notification.

* * * * *